(12) United States Patent
Bhela et al.

(10) Patent No.: US 7,305,365 B1
(45) Date of Patent: *__Dec. 4, 2007__

(54) SYSTEM AND METHOD FOR CONTROLLING ACCESS TO LOCATION INFORMATION

(75) Inventors: Harvinder S. Bhela, Woodinville, WA (US); Stephen L. Lawler, Redmond, WA (US); Rajesh M. Rao, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1265 days.

This patent is subject to a terminal disclaimer.

(21) Appl. No.: 10/184,467

(22) Filed: Jun. 27, 2002

(51) Int. Cl.
*G06F 17/60* (2006.01)
(52) U.S. Cl. ............... 705/51; 705/10; 455/456.1; 455/456.2; 455/456.3; 455/456.5; 709/200; 709/246
(58) Field of Classification Search ............. 705/10, 705/51; 455/456.1–456, 456.5
See application file for complete search history.

(56) References Cited

U.S. PATENT DOCUMENTS

| | | | |
|---|---|---|---|
| 5,890,070 | A | 3/1999 | Hamada |
| 6,011,461 | A | 1/2000 | Luper |
| 6,091,956 | A | 7/2000 | Hollenberg |
| 6,094,164 | A | 7/2000 | Murphy |
| 6,098,048 | A | 8/2000 | Dashefsky et al. |
| 6,181,689 | B1 | 1/2001 | Choung et al. |
| 6,374,177 | B1 | 4/2002 | Lee et al. |
| 6,415,318 | B1 | 7/2002 | Aggarwal et al. |
| 6,489,893 | B1 | 12/2002 | Richards et al. |
| 6,522,875 | B1 | 2/2003 | Dowling et al. |
| 6,571,279 | B1 * | 5/2003 | Herz et al. ............ 709/217 |
| 6,615,131 | B1 | 9/2003 | Rennard et al. |
| 6,628,928 | B1 | 9/2003 | Crosby et al. |
| 6,741,853 | B1 | 5/2004 | Jiang et al. |
| 6,784,809 | B2 | 8/2004 | Flick |

(Continued)

FOREIGN PATENT DOCUMENTS

WO WO 98/52379 A1 11/1998

(Continued)

OTHER PUBLICATIONS

Marmasse, N., and C. Schmandt, "Location-Aware Information Delivery with *ComMotion*," Handheld and Ubiquitous Computing, Second International Symposium, HUC 2000, Bristol, UK, Sep. 25-27, 2000, Proceedings, pp. 157-171.

(Continued)

*Primary Examiner*—Romain Jeanty
(74) *Attorney, Agent, or Firm*—Christensen O'Connor Johnson Kindness PLLC

(57) ABSTRACT

A system and method for providing location information associated with a location owner to location consumers. A location server includes an owner profile for controlling access to the owner's location information. The owner profile contains a time period during which particular location consumers are authorized to access location information associated with the location owner. In response to a location consumer requesting the location owner's location information, the location server determines whether the request lies within the time period associated with the location consumer. If the request lies within the time period associated with the location consumer, the location server obtains location information from a location provider and transmits the location information to the location consumer.

16 Claims, 15 Drawing Sheets

U.S. PATENT DOCUMENTS

| | | |
|---|---|---|
| 6,813,501 B2 | 11/2004 | Kinnunen et al. |
| 6,847,824 B1 | 1/2005 | Contractor |
| 6,853,848 B2 | 2/2005 | Sahinoglu |
| 6,853,911 B1 | 2/2005 | Sakarya |
| 6,873,258 B2 | 3/2005 | Marples et al. |
| 6,898,434 B2 | 5/2005 | Pradhan et al. |
| 6,909,903 B2 | 6/2005 | Wang |
| 6,922,723 B1 | 7/2005 | Sharp et al. |
| 6,925,481 B2 | 8/2005 | Singhal et al. |
| 6,944,679 B2 | 9/2005 | Parupudi et al. |
| 2001/0055975 A1 | 12/2001 | McDonnell et al. |
| 2002/0080968 A1 | 6/2002 | Olsson |
| 2003/0035544 A1 | 2/2003 | Herle et al. |
| 2003/0109988 A1 | 6/2003 | Geissler et al. |
| 2004/0171380 A1 | 9/2004 | Puranik et al. |
| 2004/0180668 A1 | 9/2004 | Owens et al. |

FOREIGN PATENT DOCUMENTS

| | | |
|---|---|---|
| WO | WO 0004730 A1 * | 1/2000 |
| WO | WO 03/065754 A1 | 8/2003 |

OTHER PUBLICATIONS

Oppermann, R., and M. Specht, "A Context-Sensitive Nomadic Exhibition Guide," *Handheld and Ubiquitous Computing*, Second International Symposium, HUC 2000, Bristol, UK, Sep. 25-27, 2000, Proceedings, pp. 127-142.

Cheverst, K., et al., "Providing Tailored (Context-Aware) Information to City Visitors," *Adaptive Hypermedia and Adaptive Web-Based Systems*, International Conference, AH 2000, Trento, Italy, Aug. 28-30, 2000, Proceedings, pp. 73-85.

Dogac, A., and A. Tumer, "Issues in Mobile Electronic Commerce," *Journal of Database Management*, vol. 13, No. 1, Jan.-Mar. 2002, pp. 36-42.

* cited by examiner

SYSTEM AND METHOD FOR CONTROLLING ACCESS TO LOCATION INFORMATION

FIELD OF THE INVENTION

This invention relates to computer software and communication networks and, more particularly, the invention relates to a system and method for providing personal location information to third parties.

BACKGROUND OF THE INVENTION

In an information age, remaining connected to information at all times is extremely important. People use many devices and services to stay connected to information and to other people, such as cell phones, pagers, personal digital assistants (PDAs), and laptop computers. A by-product of this connectivity is the tremendous amount of personal information that is generated, or known, concerning each "user." This personal information covers a broad spectrum of categories, such as credit information, phone numbers, and addresses, to name just a few.

Personal information, in general, is becoming more and more valuable. In order to be more effective with their marketing efforts, merchants are willing to pay large amounts of money to find out very personalized information about individuals. On the other hand, personal information is also extremely important to control. For many important personal reasons, individuals generally do not want their personal information disclosed, including information the service providers possess. However, individuals may be willing to allow some personal information to be distributed to others, including merchants, if the individuals can control the type and amount of information distributed and possibly receive some value in exchange for that information. For example, a person may be willing disclose his or her whereabouts in exchange for valuable opportunities, such as a special sale or discount with a merchant.

One area of personal information that is increasingly useful, important, and valuable is a person's physical location. Automated guidance and global location services depend upon identifying a person's, or a thing's, location. Fleet management can greatly benefit from monitoring the physical location of a fleet of vehicles. Merchants make use of a person's location, offering specials to those who are in a certain area. As mentioned above, some merchants are willing to pay for such information. Alternatively, it may be nice to locate one's friends in order to determine a convenient gathering location. As can be seen, there are many times that it is advantageous for a person to disclose the person's physical location.

Many devices or services are capable of generating or collecting location information. For example, wireless telephone services are able to locate a person by sensing the presence of a person's wireless telephone in a particular coverage area, or cell. Similarly, a wireless network service is able to locate a person by sensing the presence of the person's computing device with a range of wireless gateways, such as an IEEE 802.11 (b) or a Bluetooth-enabled network. In both of these examples, the service senses the location of a broadcasting device and therefore knows that the device is within a certain area. In another embodiment, global positioning system ("GPS") devices utilize geosynchronous satellite signals to calculate a person's position, which can be displayed to the person.

Electronic calendars and e-mail applications can also generate location information. For example, a person may enter an appointment in an electronic calendar that specifies location information. Additionally, an e-mail message may include statements such as, "I'm at work," that correspond to location information. Clearly, there are many ways which devices, or services, or both, can generate information about a person's location.

Although there are a number of ways to obtain location information, most location information generating systems are closed, meaning that the location information is used only within the system, if the location information is used at all. For example, wireless devices typically use location information to obtain wireless service. Current location information is displayed by a GPS device to the person operating the device. Both of these closed location information generating system examples are not well suited to allow a "located" person to exploit the value of that location information by providing it to others outside of the system. In general, typical location information generating systems do not allow a "located" person to distribute the location information to third parties and/or permit the "located" person to control the distribution of the location information to the third parties.

Rather than a single device or service, a person may be associated with multiple sources of location information. For example, a person may have a wireless telephone, a computing device running an electronic calendar and e-mail, and a GPS device. All of these devices and services are able to generate location information for that person with differing degrees of accuracy. However, in the past, no mechanism for collecting and/or processing the various sources of location information to provide a person's location information when a request for the persons location is made.

In addition to the above-described shortcomings, most existing location information generating systems do not provide individuals with adequate resources for controlling the way third-party entities access the individual's location information. For example, when a location owner provides access to their location information, the location information may be indiscriminately received by any person, computer, or third-party entity having access to the system. As a result, most existing location information generating systems cannot readily meet the privacy needs of location information owners.

Existing systems that allow uncontrolled access to an owner's location information also present other disadvantages. For instance, uncontrolled access of an owner's location information does not allow the owner to provide different types of access to different recipients of the location information. Moreover, uncontrolled access of an owner's location information does not allow the owner to restrict the availability of their location information to specific time periods. A need for such restriction capabilities may arise in a number of situations where a location owner has different reasons for sharing his or her location information with different individuals. For example, an employee may only want to share his or her location information with other employees during business hours. However, at the same time, the same employee may want to share his or her location information with family members at all times. To date, existing systems fail to provide location owners with the ability to selectively share location information with different users at different times.

What is needed is an improved location information generating system that provides controlled access to a person's location information. In addition, there is a need for a location information generating system that allows a location owner to control access to the owner's location information to different users at different times.

SUMMARY OF THE INVENTION

The present invention is directed to providing a system, method, and computer-readable medium for providing controlled access to location information associated with an owner of the location information. More specifically, the present invention provides a method and system that allows a location owner to control the time periods during which different users can access the owner's location information. In accordance with the invention, a location consumer submits a request to a location server to retrieve location information associated with a particular location owner. In response to the receipt of the request for the owner's location information, the location server obtains location information associated with the location owner. The location server examines an owner profile associated with the location owner and determines if the requesting consumer is authorized to access the location information during a time period associated with the request, which may be the time period in which the request was made. If authorization is granted, the location server processes the request and transmits the processed location information to the location consumer.

In accordance with other aspects of this invention, authorizing access to the location information comprises obtaining a time associated with a request for location information, obtaining authorization data from an owner profile, wherein at least a portion of the authorization data is associated with the requesting location consumer, determining if the time associated with the request for location information coincides with a time period when the location information can be accessed by the requesting location consumer, and if the time associated with the request for location information coincides with at least one time period indicated in the authorization data, granting authorization for the requesting location consumer to receive the location information.

As will be readily appreciated from the foregoing summary, processing location information according to an owner profile allows a location owner to selectively control the availability of his or her location information to individual location consumers in different ways. For example, the owner profile may be configured to authorize a specific location consumer to access the owner's location information during weekdays between the hours of 9 A.M. and 5 P.M. At the same time, the owner profile may provide unlimited access to a separate select group of location consumers at all times.

A system formed in accordance with the present invention preferably obtains and stores an owner profile that controls the availability of an owner's location information in a location server. Preferably, the server includes an administrative module for allowing a location owner to configure the owner profile. In this exemplary embodiment of the invention, the administrative module allows the location owner to configure privacy information in the owner profile such that location information can be accessed by specific location consumers only during predetermined time periods. Preferably, the predetermined time periods can be any configurable period of time, including, but not limited to, repeated blocks of time, a date, a series of dates, etc. Preferably, the format of the owner profile allows the location owner to associate one or more predefined time blocks with individual location consumers or groups of location consumers. Such formatting provides a clear indication when the individuals or groups can access the location information.

Computer-readable medium formed in accordance with the invention includes computer-executable components for providing an owner's location information to a location consumer. Preferably, the computer-executable components comprise a core services module, an owner profile database, and a location provider module. The core services module processes requests received from location consumers according to the owner profile. More specifically, the owner profile database is communicatively coupled to the core services module and provides the owner profile to the core services module. The location provider module is communicatively coupled to the core services module and obtains information about the location of the location owner from a location provider. The core services module determines whether the location consumer is authorized to access the location owner's location information by the use of a number of predetermined time periods described in the owner profile that indicate when a requesting location consumer can access the owner's location information. If it is determined that the location consumer is authorized to receive the location information, the core services module obtains the location owner's location information from the location provider module, processes the location owner's location information according to the owner profile, and transmits the processed location information to the location consumer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
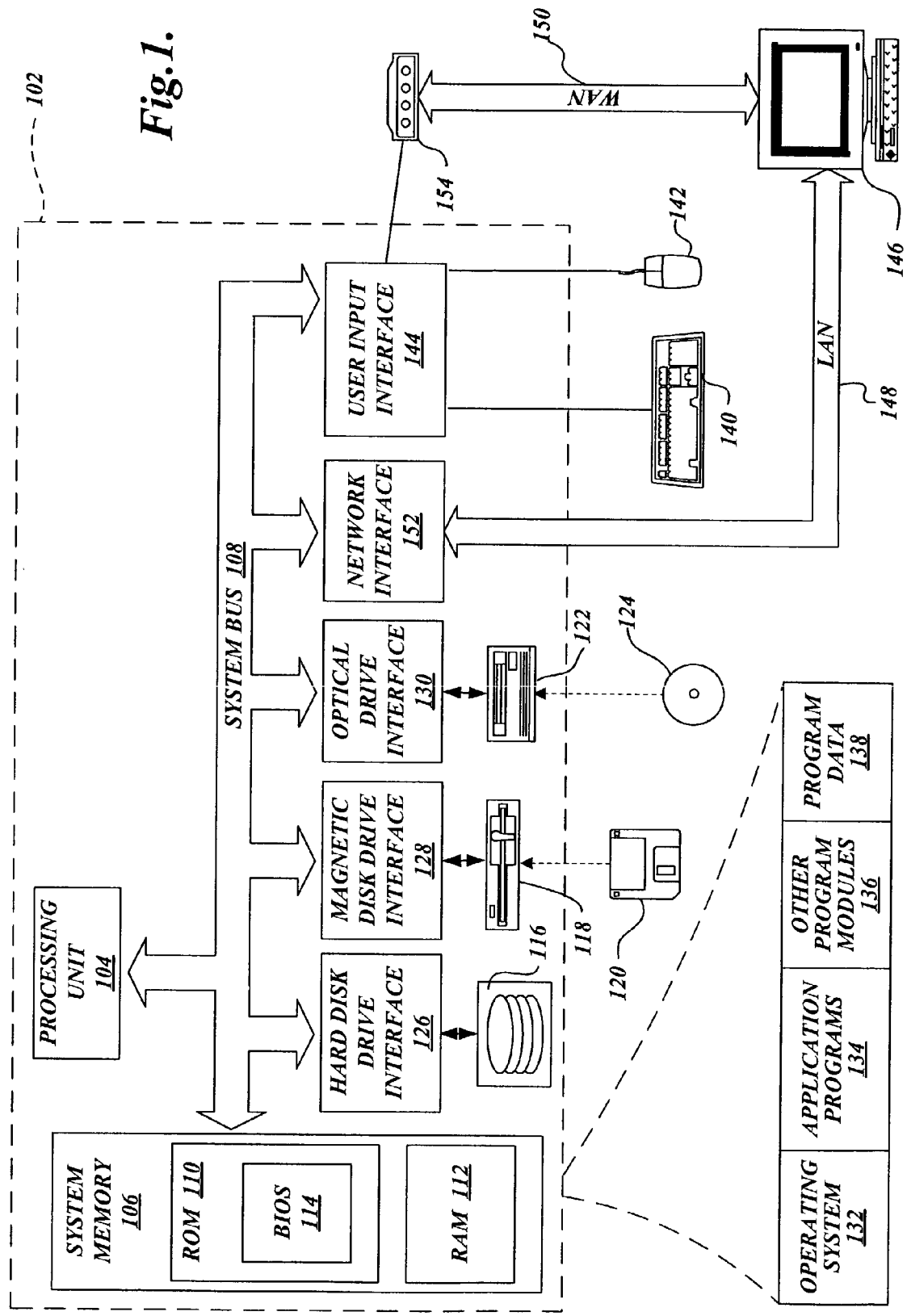
FIG. 1 is a block diagram of a computer system suitable for providing an exemplary operating environment for the present invention.

FIG. 1 and the following discussion are intended to provide a general description of a computing system suitable for implementing various features of the invention. While the computing system will be described in the general context of a personal computer usable in a distributed computing environment, where complimentary tasks are performed by remote computing devices linked together through a communications network, those skilled in the art will appreciate that the invention may be practiced with many other computer system configurations, including hand-held devices, multiprocessor systems, microprocessor-based or programmable consumer electronics, minicomputers, mainframe computers, and the like. The invention may be practiced in a local area network, or alternatively, on a single computer using logical, rather than physically remote, devices. Additionally, while the invention will be described in terms of application programs that run on an operating system in conjunction with a personal computer, those skilled in the art will recognize that the invention also may be implemented in combination with other program modules. Generally, program modules include routines, programs, components, data structures, etc., which perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read only memory (ROM) 110 and random access memory (RAM) 112. A basic input/output system (BIOS) 114, containing the basic routines that help to transfer information between elements within the personal computer 102, such as during start-up, is stored in ROM 110. The personal computer 102 further includes a hard disk drive 116, a magnetic disk drive 118, e.g., to read from or write to a removable disk 120, and an optical disk drive 122, e.g., for reading a CD ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD ROM disk, it should be appreciated by those skilled in the art that other types of media, which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touch pad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A monitor (not shown) or other type of display device is also connected to the system bus 108 via an interface, such as a video adapter (not shown). In addition to the monitor, personal computers typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, Intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used.

Figure 2:
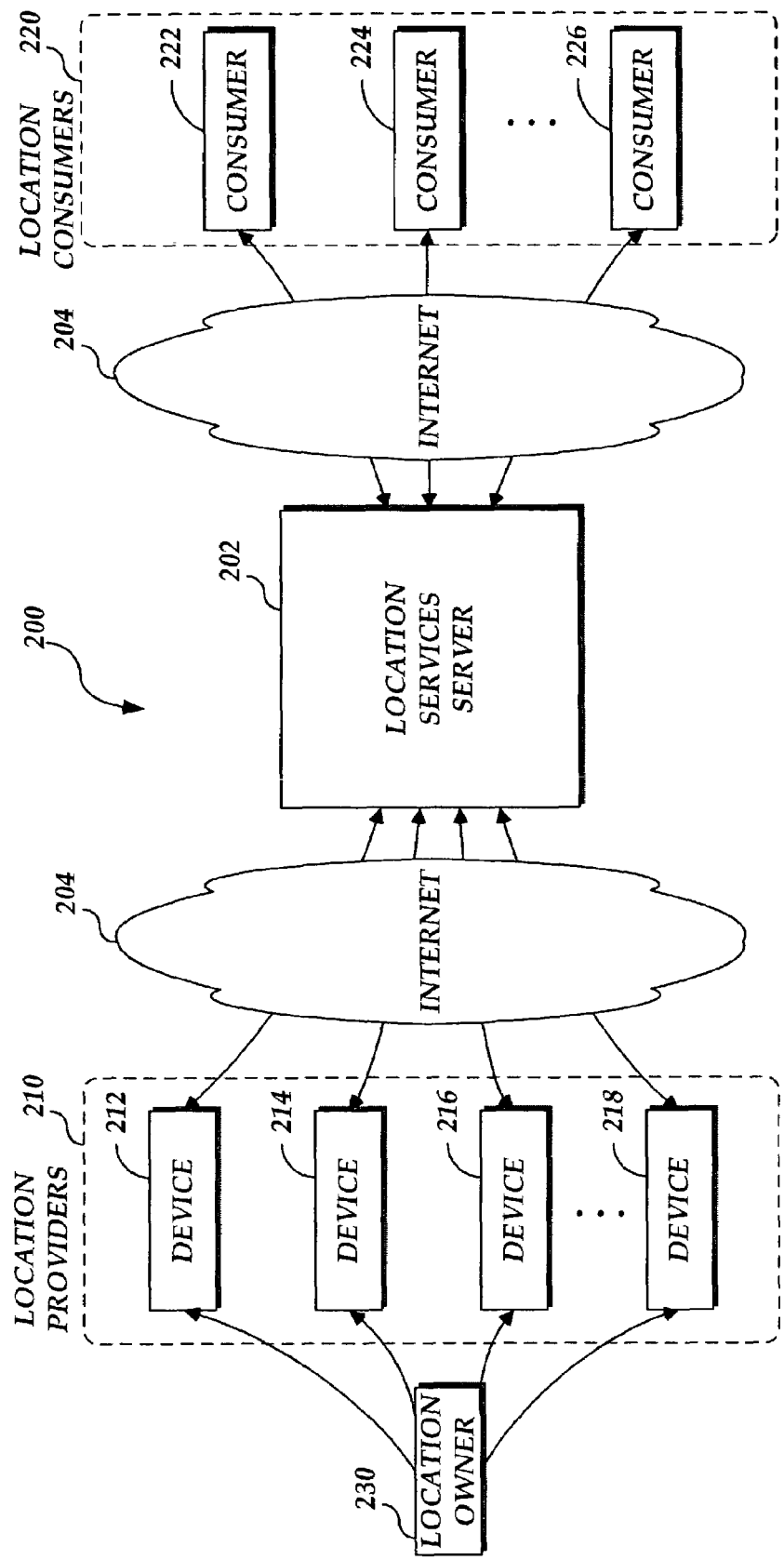
FIG. 2 is a block diagram illustrating an exemplary location service network environment suitable for implementing the present invention.

FIG. 2 is a block diagram illustrating an exemplary location service network environment 200 suitable for implementing the present invention. The location service network 200 can include a location services server 202, a network, such as the Internet 204, location providers 210 including location devices 212-218, and location consumers 220 including consumers 222-226. The location providers 210 generate location information corresponding to the location of the location owner 230. The location providers 210 can include devices such as wireless telephones, PDAs, GPSs, network connections in wireless networks and LANs, personal electronic calendars, specially equipped automobiles, and other devices operable to generate location information. Location providers 210 also include direct owner information submittals. Frequently, these devices, or location providers, operate through service providers (not shown). In such cases, it may actually be the service providers that generate the location information for the location services server 202.

In an illustrative embodiment of the present invention, the location providers 210 may be characterized by communication classifications: single/multiple, and push/pull. A single/multiple classification refers to whether a location provider submits information for one or multiple location owners. For example, a wireless telephone service will typically provide information for multiple persons and would therefore be classified as a multiple location provider. On the other hand, a person's PDA will usually provide information for just the person, and would be single location provider. A push/pull classification, refers to whether a location provider "pushes" location information to the location services server 202 on its own, i.e., without receiving a query for the information, or whether the location provider must be queried, or "pulled," for information before it will provide the location information. In addition to the classifications listed, one skilled in the art will recognize that additional or alternative classifications may also be utilized.

In accordance with the present invention, a location provider's classification in one category may influence its classification in another category. As an example, those location providers 210 classified as multiple location providers are often also classified as push location providers. Wireless telephone services may be an example of a multiple/push location provider. This is primarily because multiple location providers could be easily overwhelmed with individual requests for location information if they did not control the flow of location information to the location services server 202 in a rational manner. Thus, according to one embodiment of the present invention, when dealing with multiple/push location providers, the locations services server 202 provides the location providers 210 the names of locations owners, such as location owner 230, for which the location provider is to "push" location information to the location services server 202.

As shown in FIG. 2, according to one aspect of the present invention, the location providers 210 communicate with the location services server 202 which may take the form of a personal computer 102 of the type shown in FIG. 1, through the Internet 204. One skilled in the art will appreciate that other channels of communication between the location providers 210 and the location services server 202 are possible. As an example, the location providers may communicate with the location services server through local area networks or direct communication such as land-based lines or wireless telephone connections. Thus, while FIG. 2 illustrates that the location providers 210 communicate with the location services server 202 through the Internet 204, it is for illustrative purposes only, and not intended to be a limitation on the present invention.

The location consumers 220 are those persons, or entities, that query the location services server 202 for location information concerning a location owner, such as location owner 230. The location consumers may include a spouse, friends, employers, and merchants. The location consumers 220 submit requests to the location services server 202 in order to obtain location information corresponding to a location owner. FIG. 2 illustrates that these location consumers 220 communicate with a location services server 202 through the Internet 204. One skilled in the art will recognize that the location consumers 220 may communicate with a location services server 202 through other communication means not illustrated in FIG. 2. For example, the location consumers 220 may communicate with the location services server 202 through direct landlines or wireless communication devices. Thus, while FIG. 2 illustrates that the location consumers 220 communicate with the location services server 202 through the Internet 204, is for illustration purposes only, and not intended to limit the manner in which location consumers 220 may communicate with the location services server 202.

Figure 3:
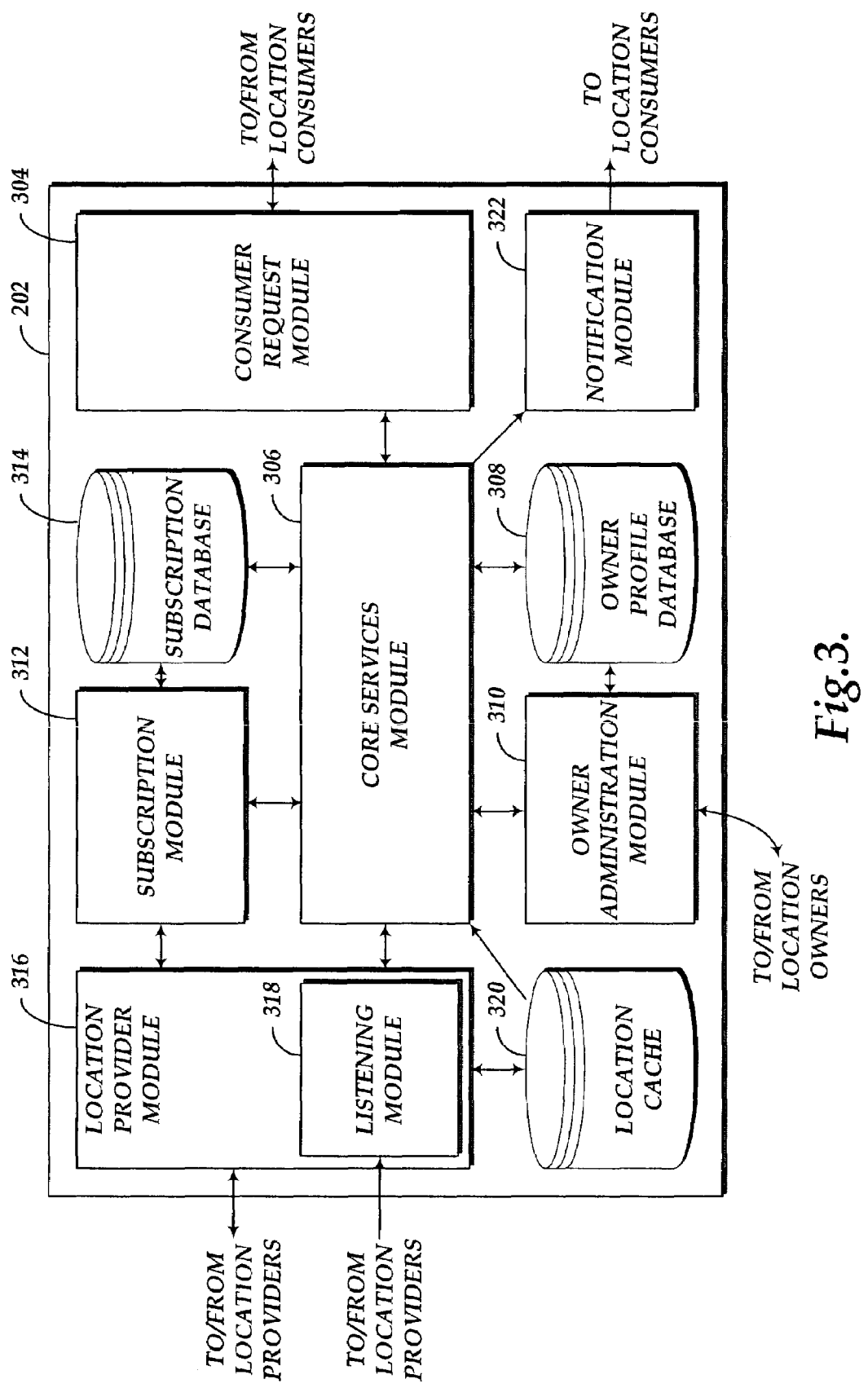
FIG. 3 is a block diagram illustrating an exemplary embodiment of logical components and relationships within a location services server.

FIG. 3 is a block diagram illustrating an exemplary embodiment of logical components and relationships within a location services server 202 (FIG. 2.) According to one aspect of the present invention, the location services server 202 includes a consumer request module 304 to obtain location requests from location consumers 220 for location information. Depending on the type of requests received from the location consumers 220, such as whether the request is a synchronous, asynchronous, or subscription request, the consumer request module 304 may also be the channel through which the location services server 202 transmits the location information to the location consumer 220. The consumer request module 304 internally communicates received requests to a core services module 306. Other functions of the location services server 202 are described in greater detail in commonly assigned and co-pending U.S. application Ser. No. 10/184,138, filed on Jun. 27, 2002, and entitled "SYSTEM AND METHOD FOR PROVIDING PERSONAL LOCATION INFORMATION TO LOCATION CONSUMERS FROM A LOCATION SERVICES SERVER," the subject matter of which is specifically incorporated herein by reference.

According to one aspect of the present invention, the core services module 306 acts as the general processing module for the location services server 202. The core services module 306 takes care of many duties, such as authenticating and authorizing location consumers, and filtering location information according to privacy information provided by a location owner in response to an information request. In accordance with an aspect of the present invention, privacy information may include: an access control list describing location consumers authorized to view the information; granularity of the location information where some location consumers are given more or less diffuse location information; and restrictions on a location consumer to particular location providers.

In accordance with the present invention, the privacy information also includes control parameters that allows a location owner 230 to selectively restrict a location consumer's access to the owner's location information to specified time periods. In one illustrative example, an employee of a particular company may allow his or her location information to be accessed by a supervisor on weekdays between the hours of 9 A.M. and 5 P.M. At the same time, the employee may provide unlimited access to his or her location information to family members. Thus, the invention allows a location owner 230 to control access to his or her location information.

In the illustrated embodiment of the invention, the core service module 306 is configured to restrict the distribution of a location owner's location information based on a number of time restriction parameters. In accordance with the invention, a time restriction parameter may restrict access to location information to a specific time of day, a specific duration of time, a set of repeated time blocks, or any other set of time restrictions specified by the location owner 230. Individual time restriction settings can be associated with individual location consumers 220 or a group of location consumers 220. Thus, embodiments of the present invention can be configured to provide controlled access to different consumers with varying levels of access capabilities.

The privacy information may also include geographic-based restrictions to determine a user's ability to access an owner's location information. Additional information related to the embodiment involving the geographic-based restriction features is described in greater detail in commonly assigned and co-pending U.S. application Ser. No. 10/184,136, filed Jun. 27, 2002, entitled "SYSTEM AND METHOD FOR CONTROLLING ACCESS TO LOCATION INFORMATION," the subject matter of which is specifically incorporated herein by reference. Geographic and time-based restrictions can be combined in actual embodiments of the invention, if desired, such that a location consumer will only be provided with an owner's location information if the location owner is within (or without) a prescribed geographic area when a location request is received that falls within the time parameters contained in the owner profile associated with the requesting location consumer.

In one embodiment of the present invention, location owners enter their owner profile information, including the time and/or geographic information described above, as well as any other privacy information, through an owner administration module 310. The owner profile information is stored by the owner administration module 310 in an owner profile database 308. The owner profile stored in the owner profile database 308 allows the core services module 306 to restrict the location information requested by a location consumer according to the location owner's specifications.

Preferably, privacy information, namely, time restriction parameters, is stored in the owner profile database 308. As will be readily appreciated by those of ordinary skill in the art, the format of the time restriction parameters stored in the owner profile database 308 can take a variety of forms. The use of any suitable generally known database format allows the time restriction parameters to be accessed by the core services module 306 when determining the access authorization for a location consumer. Preferably, the format allows the location owner to associate one or more predefined time blocks with individual location consumers or groups of location consumers to indicate when the individuals or groups can access the location information. In addition, preferably, the chosen database formats will allow the location owner 230 to enter and manage their time restriction parameters by the use of a graphical user interface, provided, for example, by the owner administration module 310.

Although the illustrated embodiments of the invention utilizes an owner profile database 308, owner administration module 310, and a core services module 306 to control and access the time restriction parameters, those skilled in the art will appreciate that there are many ways in which a location owner can authorize or restrict authorization to location consumers. Thus, the herein-described embodiments of the invention should be construed as illustrative and not limiting. For instance, the time restriction parameters of the privacy information can be stored in and accessed from other databases, such as the subscription database 314 described below, or any other like storage device.

The core services module 306 may also interact with a subscription module 312 and a subscription database 314 when the location request, received at the consumer request module 304, is a subscription request. In one embodiment of the present invention, a subscription request indicates that the location consumer wishes to be notified of events relating to one or more location owners. In an alternative embodiment, a subscription request may identify only one location owner. The subscription request may identify a number of subscribed events, including, but not limited to, changes in location, entering or leaving a particular geographic region, or the expiration of a time interval. Information necessary for the subscription module 312 to process the subscription request is stored in the subscription database 314.

In accordance with an embodiment of the present invention, the subscription module 312 is responsible for processing and monitoring events related to the subscription requests. When the subscription module 312 detects a subscribed event relating to a location owner, the subscription module 312 sends appropriate location information to the core services module 306. The subscription module 312 also interacts with a location provider module 316 (described below) to initiate a subscribed event, or alternatively, to notify location providers of the subscribed event.

The core services module 306 processes the location information according to the privacy restrictions discussed above, and sends the processed location information to a notification module 322 to notify the location consumer. In one embodiment, the notification module 322 transmits the location information to the location consumer. Alternatively, the notification module 322 may also utilize an external notification server. Thus, the notification module 322 performs the function of a notification facilitator. Those skilled in the art will recognize that there are many ways that may be utilized to provide notification to a location consumer that fall within the scope of the present invention. Thus, these examples should be construed as exemplary and not limiting.

The location provider module 316 interacts with one or more location providers 210. The location provider module 316 sends requests to the location providers 210, indicating that a location owner will be monitored, or that location information pertaining to a particular location owner has been requested. According to one embodiment of the present invention, the location provider module 316 may synchronously request and receive location information from a location provider 210. According to another embodiment, the location provider module 316 includes a listening module 318 that listens for location information automatically generated by one or more push-type location providers 210, or by location providers that respond asynchronously to an information request. The listening module 318 receives location information from location providers 210 and supplies the received location information to the location provider module 316. In an alternative embodiment (not shown), the listening module 318 is a peer to the location provider module 316 and maintains connections to other components of the locations services server 202. In yet another alternative embodiment (also not shown), the tasks of the listening module 318 are integrated into the location provider module 316.

The listening module 318 may store received location information in a location cache 320 until it is needed, either by the subscription module 312, to monitor for a particular event, or the core services module 306, to respond to a particular location request. Storing location information in the location cache 320 is especially useful when the intervals between when push-type location providers 210 transmit subscribed location information do not correspond to the intervals specified in a subscription request. According to the embodiment shown in FIG. 3, both the location provider module 316 and the core services module 306 are able to directly access the location cache 320 in order to obtain location information. The subscription module 312 has indirect access. Alternatively, the subscription module 312 may also have directly access location information stored in the location cache 320.

FIG. 3 illustrates various logical components and relationships designed to make the present invention more easily understood. The illustrated logical components and relationships are for illustration purposes only, and not meant to be interpreted as limitations on the present invention. Those skilled in the art will appreciate that the present invention may be embodied in a variety of configurations, including configurations that comprise components other than those illustrated in FIG. 3 and described above, without departing from the scope of the invention.

Figure 4:
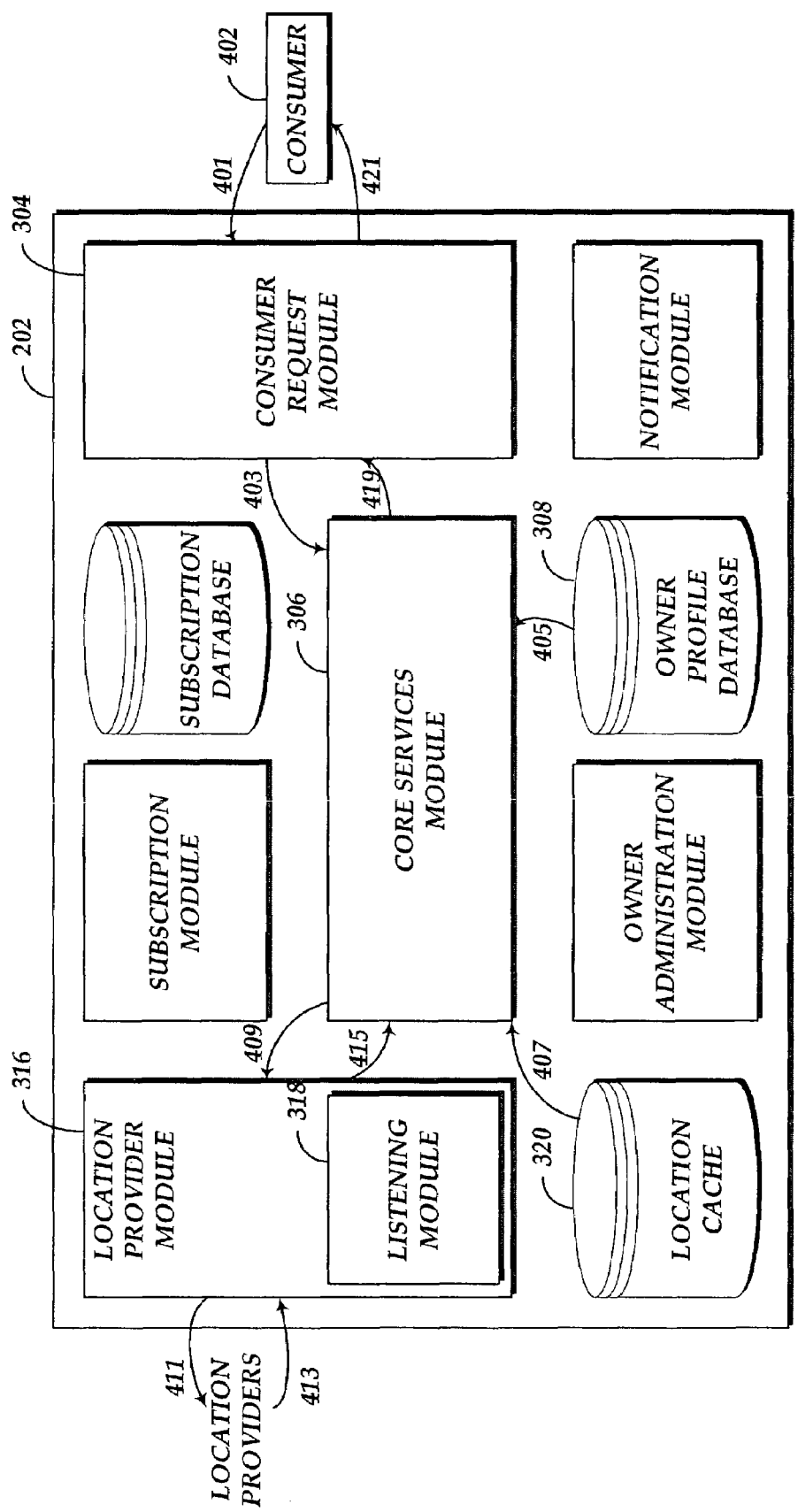
FIG. 4 is a block diagram of the logical components of the location services server of FIG. 3 illustrating an exemplary processing of a synchronous location request from a location consumer.

FIG. 4 is a block diagram of the logical components of the location services server 202 of FIG. 3 showing how the logical components process a synchronous location request from a location consumer 220. Those skilled in the art will recognize, when making a synchronous location request, the location consumer expects an immediate response from the location services server 202. For a synchronous request, the conduit through which the location request is made is also the conduit for returning the response.

FIG. 4 illustrates a location consumer 402 making a synchronous location request on the location services server 202, as indicated by arrow 401. The consumer request module 304 of the location services server 202 receives this location request. A location request will typically specify a location owner and other information necessary in order to process the location request, including, but not limited to, a specific location provider, passwords, user identification, and the like. Additionally, if the location request is an asynchronous request, the request will also typically include information for notifying the location consumer 402 when the request is completed.

The consumer request module 304 transfers the location request to the core services module 306, as indicated by arrow 403. The core services module 306 conducts an authentication and an authorization process on the location consumer 402 to verify that the location consumer is permitted to access information from the location services server 202. Assuming that the location consumer 402 is properly authenticated and authorized, the core services module 306 identifies the location owner in the location request and retrieves owner profile information from the owner profile database 308, as indicated by arrow 405. The core services module 306 then determines, using the owner profile information, whether the location consumer 402 may access location information for the specified location owner, what, if any, filters to apply, and any restrictions on the location information The owner profile information also includes location provider information. In one embodiment of the present invention, the location provider information identifies all location providers that generate information about the location of the location owner. Because some location information pertaining to the location owner may already be cached in the location cache 320, the core services module 306 queries the location cache, as designated by arrow 407, for any relevant information. For location information not found in the location cache 320, the core services module 306 submits location request information, including any location providers to be queried, to the location provider module 316, as designated by arrow 409. The location provider module 316 issues location information queries to all of the specified location providers, according to specifics previously established between the locations services server 202 and the location provider, as indicated by arrow 411. The location provider module 316 may receive some responses from location providers synchronously, while other will be received asynchronously through the listening module 318.

After all responses have been received, as designated by arrow 413, the location provider module 316 sends the information obtained from the location providers to the core services module 306, designated by arrow 415. According to one embodiment of the present invention, in order to avoid a blocking condition if one of the information providers fails to timely respond, the location provider module 316 may limit the amount of time it waits for responses, and return an incomplete response to the core services module 306. Once the location information is retrieved from the location providers, the core services module 306 generates a current location for the location owner according to any privacy restrictions the information owner may have indicated. Finally, the core services module 306 returns the generated location to the consumer request module 304, shown by arrow 419, which in turn returns the location to the location consumer 402, as designated by arrow 421.

Figure 5:
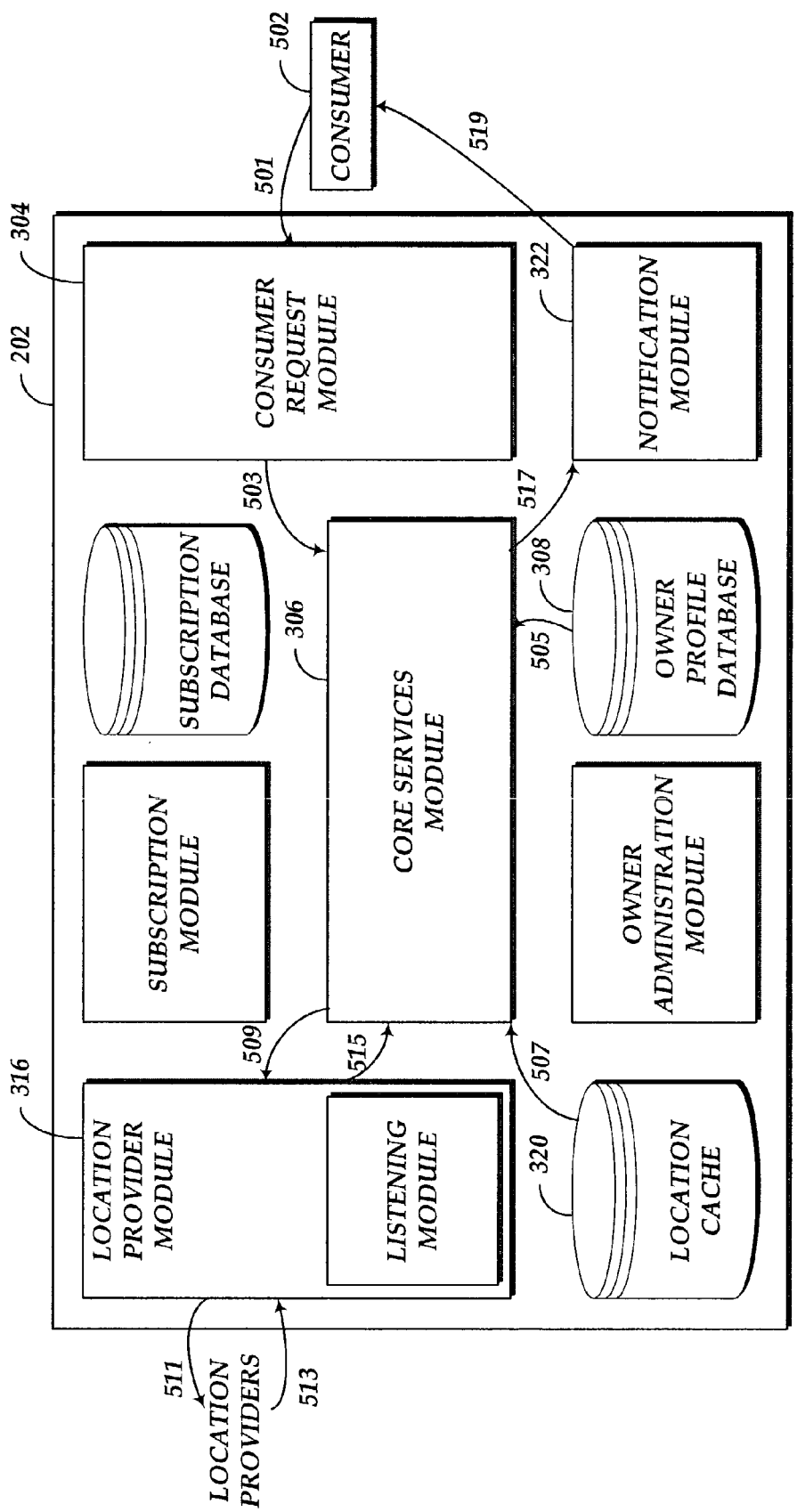
FIG. 5 is a block diagram of the logical components of the location services server of FIG. 3 illustrating the processing of an asynchronous location request from a location consumer.

FIG. 5 is a block diagram of the logical components of the location services server 202 of FIG. 3 illustrating the processing of an asynchronous location request. In the illustrated embodiment of the invention, a location consumer 502 submits the asynchronous location request, illustrated by arrow 501, to the consumer request module 304 of the location services server 202. The consumer request module 304 transfers the asynchronous location request to the core services module 306, as indicated by arrow 503. The core services module 306 retrieves owner profile information from the owner profile database 308 corresponding to the location owner identified in the location request, as described previously in regard to FIG. 4, as indicated by arrow 505.

Because the location request is an asynchronous location request, as described above, the location consumer's 502 process does not immediately require a response. Instead, the location consumer's 502 process initiates an internal process within the location services server 202 to complete the asynchronous request, and then returns. This internal process performs functions similar to those described in regard to FIG. 4, which result in location information being sent to the location consumer 502. In this internal process, the core services module 306 retrieves any location information already stored in the location cache 320, as indicated by arrow 507. For those location providers not having information stored in the location cache 320, the core services module 306 sends information identifying the information owner to the location provider module 316, as shown by arrow 509. The location provider module 316 queries the location providers, as shown by arrow 511. As previously mentioned, the location provider module 316 may receive both synchronous and asynchronous responses from the location providers, shown by arrow 513.

The location provider module 316 transfers the location information from the location providers back to the core services module 306, as shown by arrow 515. The core services module 306 processes the location information obtained from the location providers and generates a single location according to the restrictions and privacy filters identified in the owner profile information already retrieved from the owner profile database 308. The core services module 306 transfers the generated location information to the notification module 322, as shown by arrow 517. The notification module 322 then transmits to the generated location to the location consumer 502, as shown by arrow 519.

Figure 6:
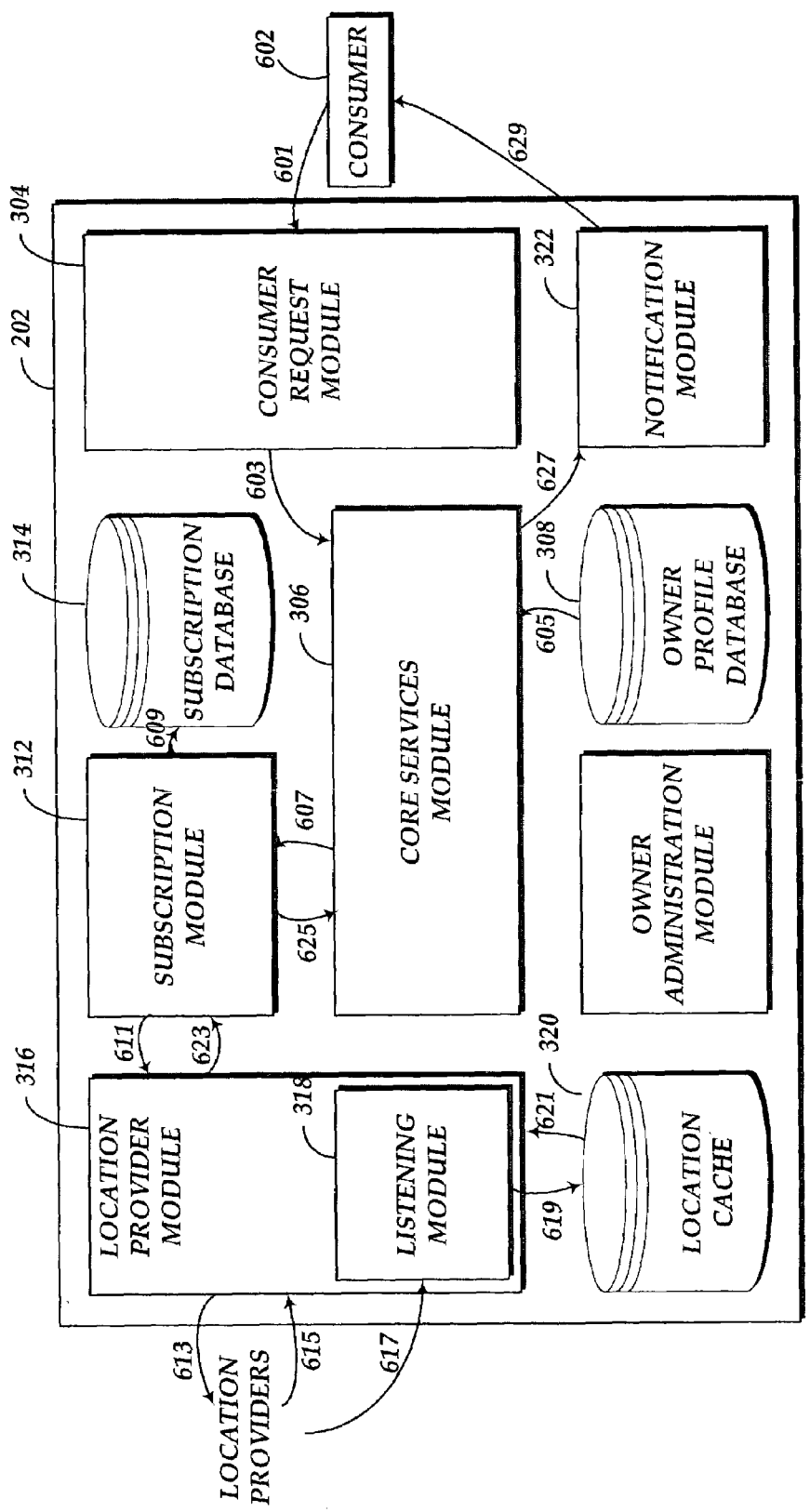
FIG. 6 is a block diagram of the logical components of the location services server of FIG. 3 illustrating the processing of a subscription request from a location consumer.

FIG. 6 is a block diagram of the logical components of the location services server 202 of FIG. 3 illustrating the processing of a subscription request from a location consumer.

While FIG. 6 illustrates a particular flow of information between the logical components of a location services server, the flow is for illustration purposes only, and should not be construed as a limitation on the present invention. Those skilled in the art will appreciate that multiple other ways of performing a subscription request fall within the scope of the present invention.

Subscriptions may persist, or remain valid, indefinitely, or for a certain amount of time. Alternatively, they may persist for a specified number of occurrences. Further, subscription requests may identify more than one targeted location owner.

As shown in FIG. 6, a location consumer 602 submits a subscription request to the consumer request module 304 of the location services server, as shown by arrow 601. The consumer request module 304 transfers the request to the core services module 306, as illustrated by arrow 603. A subscription request is similar to an asynchronous location request in that the location consumer's process returns and terminates, as described in regard to FIG. 5. However, a separate process within the location services server 304 is initiated to complete the processing of the subscription request. In this process, the core services module 304 identifies the targeted location owner of the subscription request and retrieves the owner profile information corresponding to the location owner from the owner profile database 308, as shown by arrow 605. Thereafter, the core services module 306 transfers the subscription request to the subscription module 312, as illustrated by arrow 607.

The subscription module 312 receives the subscription request and saves that request in the subscription database 314 for future processing, as shown by arrow 609. The subscription module 312 initializes any processes that need to be completed in order to fulfill the subscription request. These may include timer-based modules, such that after a certain amount of time the location services server will generate a location for the targeted location owner and return that to the location consumer 602. This process may also include listening modules that listen for location information related to the location owner. Those skilled in the art will appreciate that there may be many other modules needed to process a subscription event that are not enumerated here.

After having generated the appropriate subscription processes, the subscription module 312 transfers to the location provider module 316 identities of the location providers having location information about the targeted location owner, as indicated by arrow 611. The location provider module 316 sends notices to the location providers requesting that they respond with location information for the targeted location owner. As illustrated in this example, the location providers may respond both synchronously to the location provider module 316, as indicated by arrow 615, or alternatively, they may respond asynchronously via the listening module 318, as indicated by arrow 617. If the information is received by the listening module 318, the listening module stores the received location information in the location cache 320, as indicated by arrow 619. The location provider module 316 first retrieves the location information about the location of the location owner already stored in the location cache 320, as shown by arrow 621. The location provider module 316 returns the location information to the subscription module 312, as shown by arrow 623. After receiving the location information, the subscription module 312 processes the information and returns it to the core services module 306, as shown by arrow 625. The core services module 306 processes the information according to the privacy restrictions identified in the owner profile information retrieved from the owner profile database 308. The core services module 306 then generates location information responsive to the subscription request and transfers the location information to the notification module 322, as shown by arrow 627. The notification module 322 forwards the location information to the location consumer 602, as shown by arrow 629.

Figure 7A:
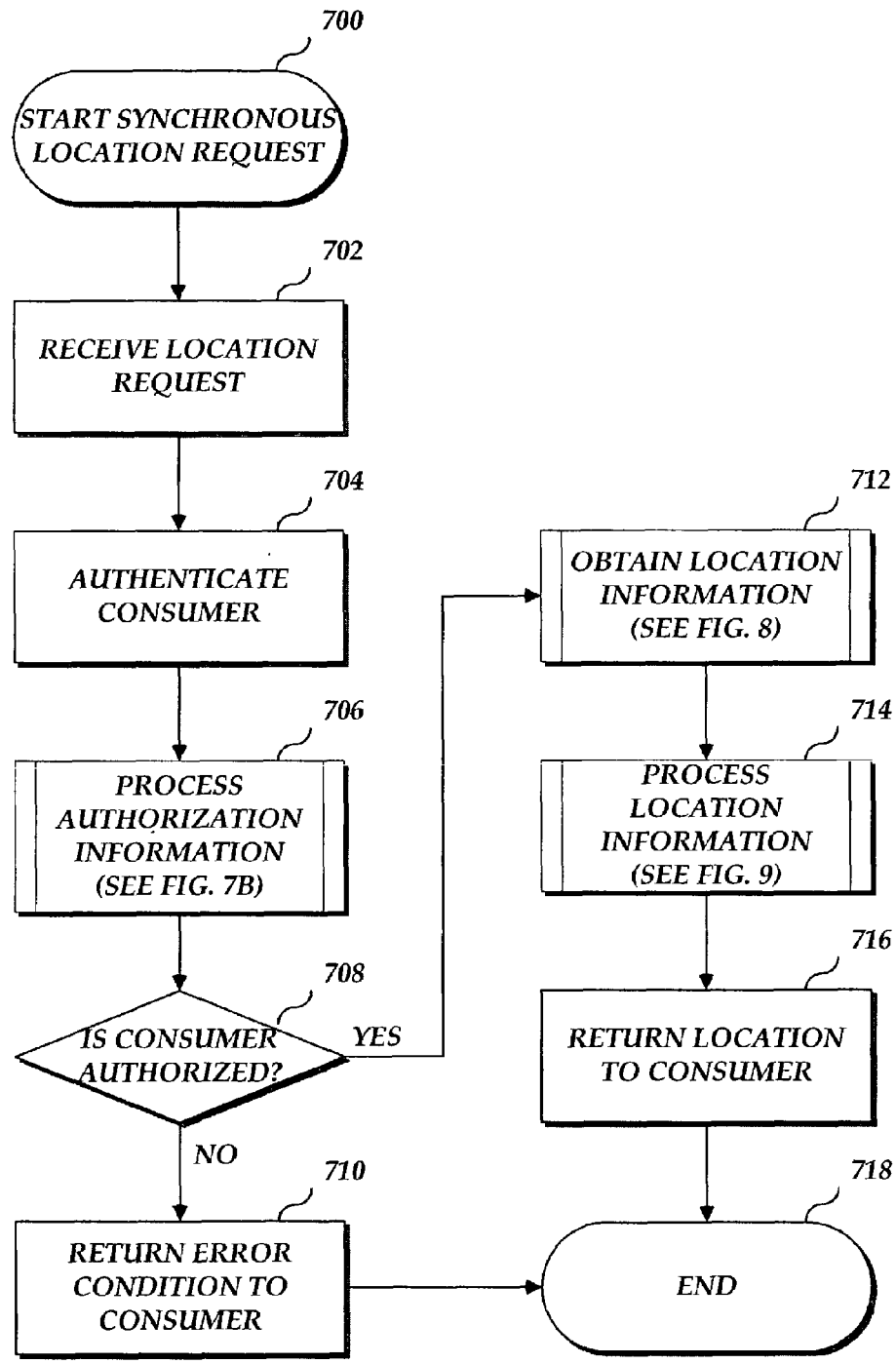
FIG. 7A is a flow diagram illustrative of an exemplary routine implemented by a location services server to process a synchronous location request from a location consumer.

FIG. 7A is a flow diagram of an exemplary routine 700 implemented by a location services server 202 (FIG. 2) for processing a synchronous information request. Beginning at block 702, the location services server 202 receives a location request from a location consumer 220. At block 704, the location services server 202 attempts to authenticate the requesting location consumer 220. The location services server 202 may utilize a third-party service, such as Microsoft Corporation's Passport.NET authentication service, to authenticate the location consumer. Alternatively, the location services server 202 may independently authenticate the requesting location consumer 220 by the use of other authentication methods, such as a generally known log-in schema, public key ID, or any other like method. The authentication process allows the location services server 202 to positively identify the location consumer 220. Determining the identity of the location consumer is critical to determining whether the location consumer is authorized to access the location owner's location information. As described in more detail below, with respect to decision block 708; if the location consumer fails to properly authenticate himself or herself to the location services server 202, an error condition is returned, and the routine 700 terminates.

After having authenticated the location consumer, the routine 700 proceeds to block 706 where the location services server 202 obtains authorization information to determine if the authenticated location consumer is authorized to receive the requested location information. Generally described, process of block 706 retrieves owner profile information, such as a location owner's privacy information, from the owner's profile database 308 (FIG. 3). The location services server 202 then uses the privacy data to determine whether the location consumer is authorized to access the location owner's location information. A more detailed description of the process of block 706 is described below with reference to FIGS. 7B and 7C.

Figure 7B:
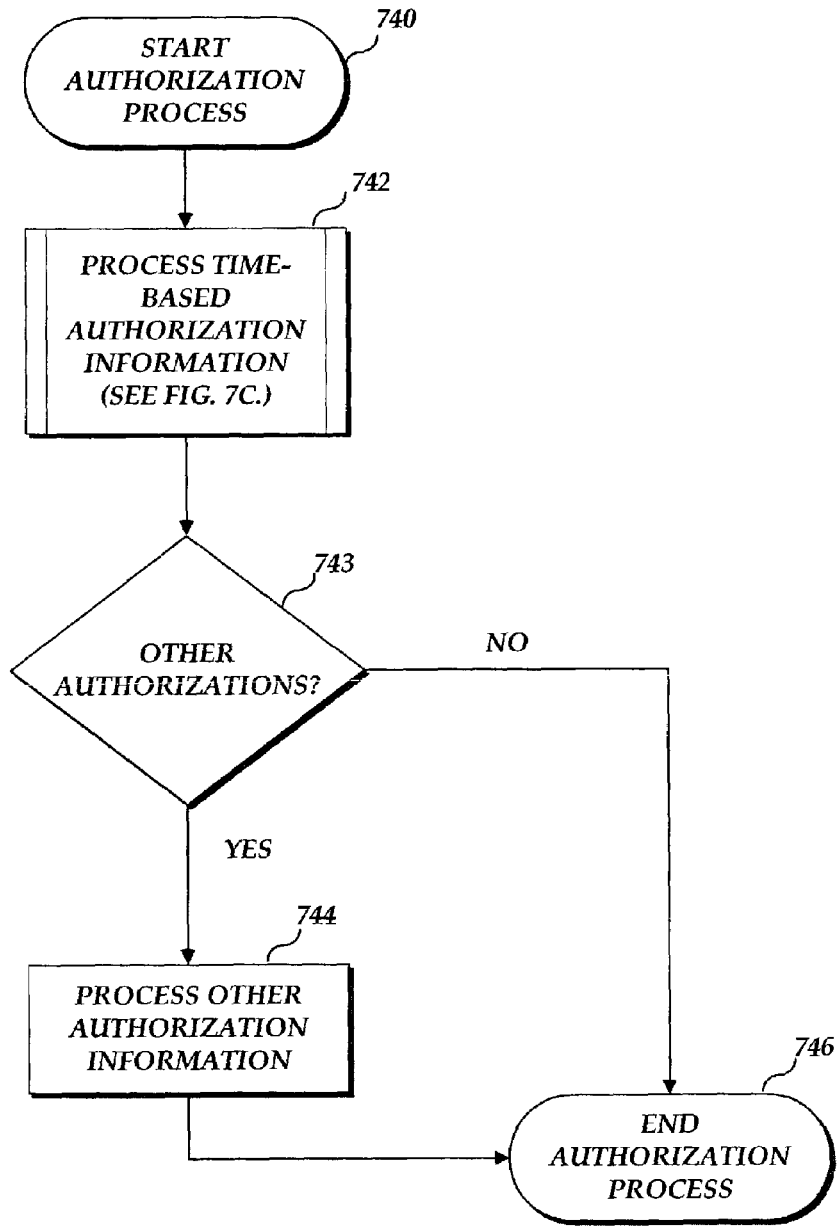
FIG. 7B is a flow diagram illustrative of a routine implemented by a location services server for processing authorization information.

FIG. 7B is flow diagram of a subroutine 740 for retrieving and processing authorization information. Generally described, the subroutine 740 examines data stored in the owner profile database 308 to determine if the requesting location consumer is authorized to receive the location information. The subroutine 740 starts at block 742 where the location services server 202 determines if the location owner 230 has restricted his or her location information based on a time-based restriction. As described above, a location owner may establish time periods during which different location consumers can access the owner's information. A more detailed description of the process of block 742 is provided below with reference to FIG. 7C.

Once the time-based restriction authorization has been processed in block 742, the subroutine 740 proceeds to decision block 743 where the location services server 202 examines other authorization parameters in the owner profile. In an alternative embodiment (not shown), if a location consumer is not authorized to access the location owner's location information according to the processing of the time-based authorization information, prior to decision block 743, the location services server 202 may proceed to directly to block 746 where the process terminates. According to this alternative embodiment, the location services server 202 is able to terminate additional authorization processing at the earliest moment that it is determined that authorization will not be granted.

As stated above, the location owner can establish a number of parameters in the owner profile that grants authorization to different consumers for different reasons. For example, the authorization in the owner profile information may categorize location consumers, and permit authorization based on categorizations. These categories may include, but are not limited to, consumer friends, and consumer services.

Consumer friends may be defined as individuals the targeted location owner has authorized to access the location information. Consumer friends may include a spouse, family members, friends, employers, and any other identifiable individual the targeted owner authorizes to access the targeted owner's location information. Consumer services may be defined as entities, or individuals, that seek the location owner's location information for commercial purposes.

For both exemplary categories of location consumers, the location owner may specify particular limitations or restrictions on accessing the targeted location owner's location information. For example, the location owner may decide that consumer services should not have access to personal location information once the location owner has quit working for the day. As a consequence, a location owner may restrict all consumer services access to the location owner's location information to normal business hours. Or, the location owner may also restrict the location owner's employer's access to the targeted owner's location information to normal business hours. Alternatively, the location owner may permit the location owner's consumer friends to have access at all times of the day.

At decision block 743, if the location services server 202 determines that there are no other authorizations to verify in the owner profile, the subroutine 740 proceeds to blocks 746 where the subroutine 740 terminates. However, if the subroutine 740 determines, at decision block 743, that there are additional authorizations to verify, the subroutine 740 proceeds to process block 744 where the location services server 202 processes the other authorizations. This authorization may include the processing of a number of parameters entered in the owner profile database 308, including, but not limited to, the restrictions to different categories of location consumers, geographic restrictions, or the like. Once the location services server 202 processes the other authorization parameters at block 744, the subroutine 740 terminates.

Figure 7C:
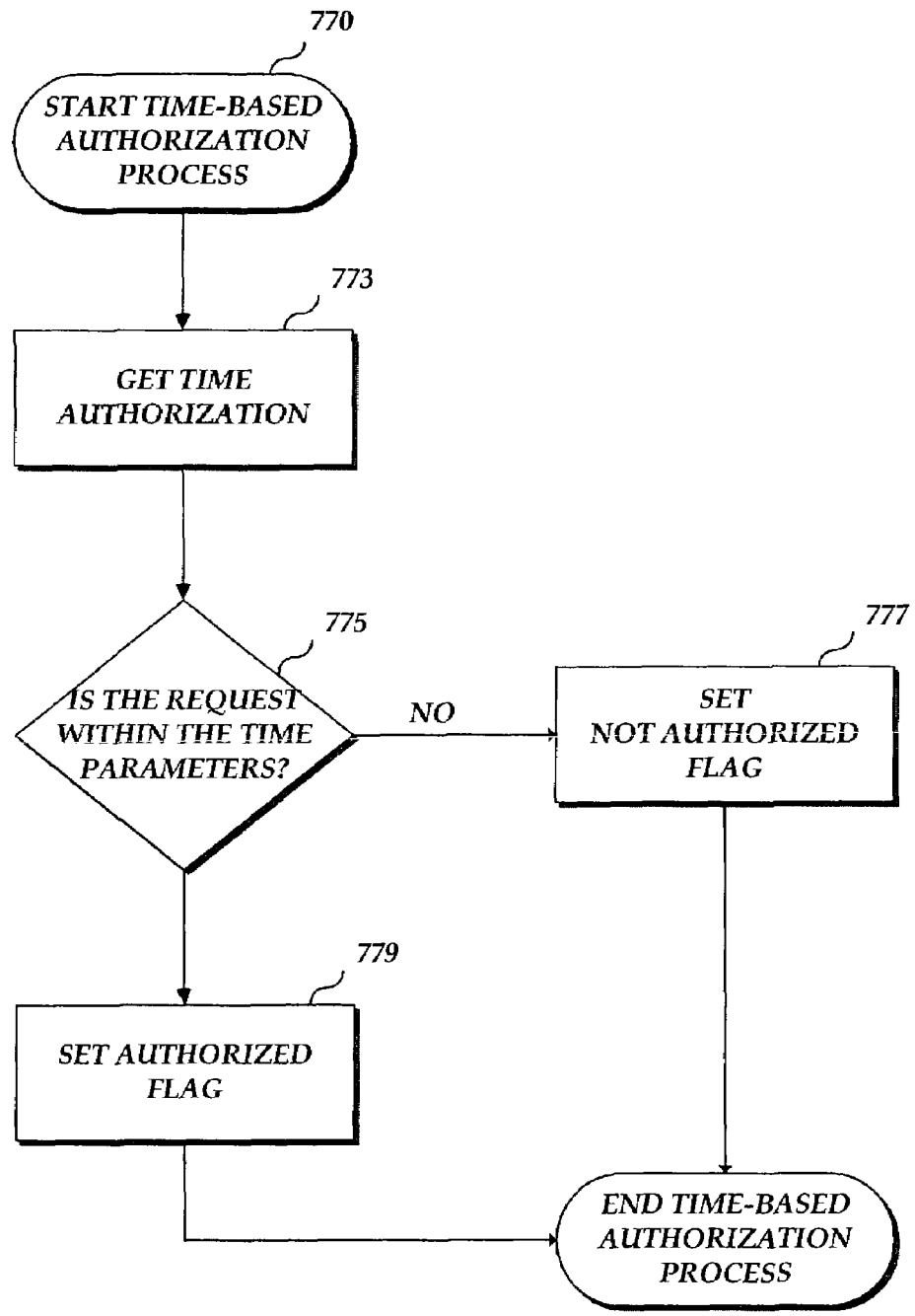
FIG. 7C is a flow diagram illustrative of a routine implemented by a location services server for processing time-based restrictions.

Referring now to FIG. 7C, an exemplary routine 770 for verifying a time-based restriction is shown. Generally described, the routine 770 involves the retrieval and examination of time restriction parameters stored in location owner's profile database 308. Once the time-based restriction parameters are retrieved, the system compares the time restriction parameters with the time at which the location consumer's request was received by the server. If the location consumer's request was received at a time that coincides with the location owner's time-based restriction parameters, the server sets a memory flag to indicate that the location consumer is authorized to receive the information. As described above, the time restriction parameters may include any predetermined time period, a repeated time period, or any other time period established by the location owner.

In the illustrated example of FIG. 7C, the routine 770 starts at process block 773 where the location services server 202 obtains the owner's privacy information, such as the time restriction parameters, from the owner profile database 308. As described above, the owner profile database 308 may be in a database format that allows a system to retrieve such parameters by the use of generally known database queries. Once the time restriction parameters are retrieved from the owner profile database 308, the routine 770 proceeds to decision block 775 where the location services server 202 determines if a time associated with the request corresponds to the time restriction parameters. As can be appreciated by one of ordinary skill in the art, a time associated with the request (received in process block 702 of FIG. 7A) can be any time associated with the request, e.g., a time when the request was received, sent, etc. As can be appreciated by those of ordinary skill in the art, any general comparison can be made to determine if the time of the request coincides with the time periods defined in the owner profile.

At decision block 775, if the location services server 202 determines that the time associated with the request does not correspond with the time restriction parameters, the routine 770 proceeds to block 777 where the location services server 202 sets a memory flag to indicate that the location consumer is not authorized to receive the location information. However, at decision block 775, if the location services server 202 determines that the time associated with the request does coincide with the location owner's time restriction parameters, the routine 770 proceeds to block 779 where the server 202 sets a memory flag to indicate that the location consumer is authorized to receive the location information.

Although the above-described example describes one embodiment involving the use of privacy information, one skilled in the art will appreciate that there are many ways in which the location owner may authorize or restrict authorization to location consumers. In addition, although the above example illustrates one embodiment where the examination of the privacy information is processed in block 706, it can be appreciated by one of ordinary skill in the art that the examination of the privacy information can be performed in other sections of the routine 700. For instance, as described below, with respect to FIG. 9, the examination of the privacy information may be performed in the subroutine 714 for processing the location information. As can be appreciated by one of ordinary skill in the art, the embodiments described above are for illustration purposes and not intended to limit the scope of the present invention.

Returning now to FIG. 7A, at decision block 708, the location services server 202 determines whether, according to authorization restrictions specified by the location owner in the owner profile, the location consumer is authorized to access the requested location information. The process of decision block 708 may involve the examination of one or more memory flags, such as those established in process blocks 777 and 779 of FIG. 7C. If the location request is outside of the permission's granted by the location owner, or if one of the memory flags indicates that the consumer is not authorized, the process proceeds to block 710 where the location services server 202 returns an error condition to the location consumer. After returning the error condition to the location consumer, the routine terminates at block 718. Alternatively, if the consumer is properly authorized to access the targeted information, or if one of the memory flags indicates that the consumer is authorized, the process proceeds to block 712 where the location services server 202 obtains the location owner's location information from the information providers.

Figure 8:
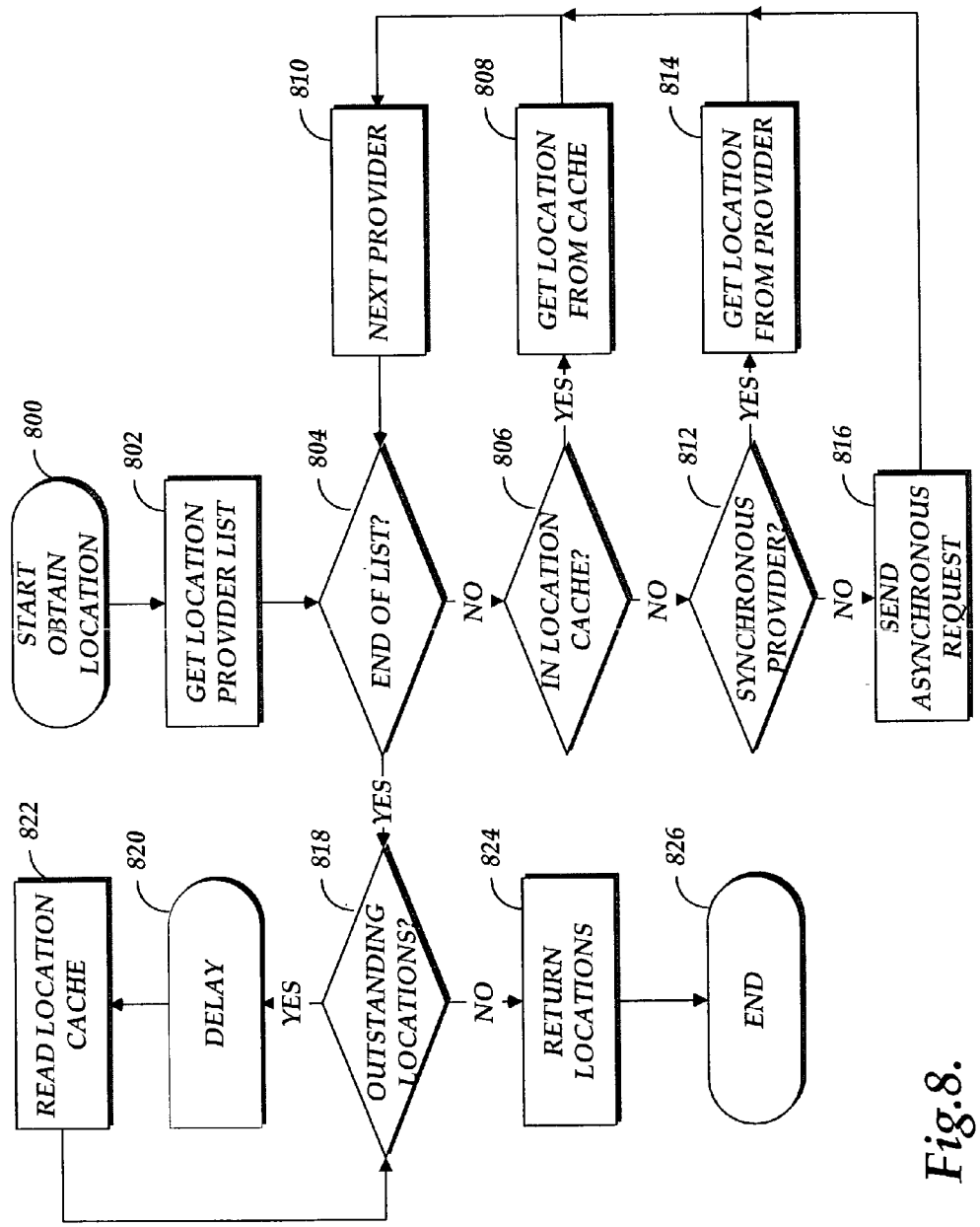
FIG. 8 is a flow diagram illustrative of a retrieval sub-routine suitable for use in FIG. 7A.

FIG. 8 is a flow diagram of an exemplary subroutine 800 implemented by a location services server 202 to obtain location information for a location owner from one or more location providers associated with the location owner. At block 802, the location services server 202 receives a location provider list associated with the location owner. Alternatively, the location services server 202 retrieves the location provider list for the targeted location owner from the owner profile database 308. At decision block 804, the subroutine iterates through each location provider in the location provider list.

At decision block 806, a test is conducted to determine whether the location information from the location provider is already in the location cache 320 (FIG. 3). This typically occurs when the location provider is a push-type provider. If the location is found in the location cache 320, at block 808, the location is retrieved from the location cache 320. At block 810, the subroutine iterates to the next location provider in the location provider list. At decision block 804, the subroutine 800 continues until location information from each remaining location provider in the location provider list has been sent a location request.

If, at decision block 806, the location is not already in the location cache 320, a test is conducted to determine whether the current location provider in the location provider list is a synchronous location provider. See, decision block 812. If the location provider is a synchronous location provider, at block 814, the location information from the synchronous location provider is retrieved. Then, as described above, at block 810, the subroutine iterates to the next location provider in the location provider list. Again, at decision block 804, the subroutine 800 continues until location information from each remaining location provider in the location provider list has been sent a location request.

If, at decision block 812, the location provider is not a synchronous location provider, at block 816, a message is sent to the asynchronous location provider requesting location information corresponding to the location owner. Because an asynchronous location provider responds asynchronously, the subroutine 800 does not wait for an immediate reply. Rather, at block 810, the subroutine 800 iterates to the next location provider in the location provider list. The subroutine 800 continues to cycle through decision block 804 until each location provider in the location provider list has been sent a location request, or location information from each location provider has been retrieved from the location cache.

After iterating through the location providers in the location provider list, at decision block 818, a test is made to determine whether any responses from location providers in the location provider list have not yet been received. This typically arises if any asynchronous requests were made. If there are outstanding location provider responses, at delay block 820, the subroutine delays a certain amount of time in order to give the asynchronous location providers a period of time to reply to the location request. At block 822, the location cache 320 is read to determine whether any of the outstanding responses from location providers have been received. Then, looping back to decision block 818, a test is again made to determine whether there are any remaining outstanding responses. Additionally (not shown), the test in decision block 818 may also consider the amount of time elapsed since the location provider module sent the request to the location provider. Preferably, the subroutine proceeds to block 824 after a predetermined amount of time has elapsed in order to prevent a blocking condition. At block 824, after all of the responses from the location providers have been received, the location information from the location providers is returned. At block 826 the subroutine terminates.

Returning to FIG. 7A, at block 714, after having obtained location from all of the location providers for the location owner, the location information is processed according to the authorization constraints specified by the location owner. Preferably, processing the location information generates a single location in response to the location request.

Figure 9:
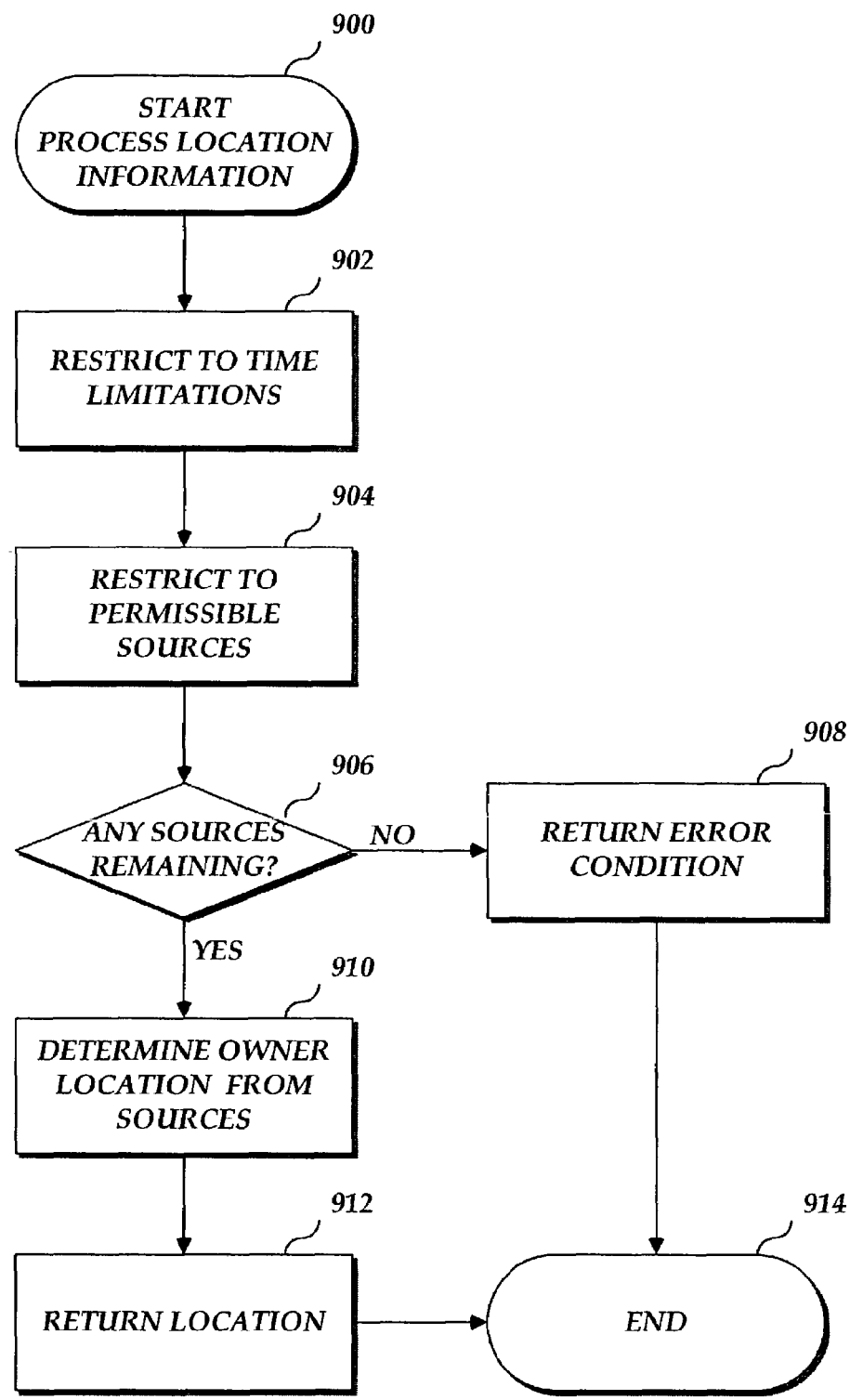
FIG. 9 is a flow diagram illustrative of another retrieval subroutine suitable for use in FIG. 7A.

FIG. 9 is a flow diagram of a subroutine 900 implemented by a location services server 202 to process one or more locations of a location owner to generate a single location. In one illustrated embodiment of the invention, the location information is processed according to the privacy information, such as the time restrictions stored in the owner profile database 308. At block 902, any location information that violates any time-base privacy limitations, as specified by the location owner in the owner profile information, is eliminated from processing. At block 904, any location information from unauthorized location providers, as specified in the location owner profile information as permissible sources for the location consumer, is eliminated from processing. While FIG. 9 illustrates two privacy restrictions, they are intended to be illustrative and not limiting on the invention. Those skilled in the art will appreciate that other privacy restrictions exist and other combinations may be applied. For example, a privacy restriction limiting location information in relation to a particular geographic area may be among the privacy restrictions. At decision block 906, a test is made to determine whether there are any remaining location sources available from which a location may be obtained. If there are no remaining location sources, at block 908 an error condition is returned to the location consumer.

Alternatively, at block 910, the remaining sources of location information are processed to generate a single location for the location consumer in response to the location request. For example, the subroutine 900 may determine the single location according to rankings of the location providers according to a hierarchy previously established by the location owner. Alternatively, the single location may be generated according to resolution information previously established by the location owner. Resolution information permits the location owner to control how precise the location will be. For example, while the information from the location providers may be able to locate the location owner within a few feet, the location owner may wish that location consumers receive only more general location information in response to a request. Alternatively, depending on privacy constraints, the current location may always be a given location. For example, otherwise authorized consumer services may receive a response of "away" during weekend days. In another alternative, the location owner may label certain geographic locations or regions in order to give greater meaning to the location information. For example, an answer such "Building C" may be more meaningful than specific location coordinates. At block 912, the generated location information is returned and the subroutine terminates at block 914. While this description identifies certain criteria for determining a current location from multiple location sources, the criteria are for illustration purposes should not be construed as limiting the invention. Those skilled in the art will recognize that other rules and criteria may be used to determine a current location from multiple location sources.

Returning to FIG. 7A, if, at block 714, an error condition was detected during processing the location sources, an error condition is returned to the location consumer (not shown).

After processing the location information to generate a single current location, at block 716, the generated location is returned to the location consumer. The routine 700 then terminates at block 718.

Figure 10:
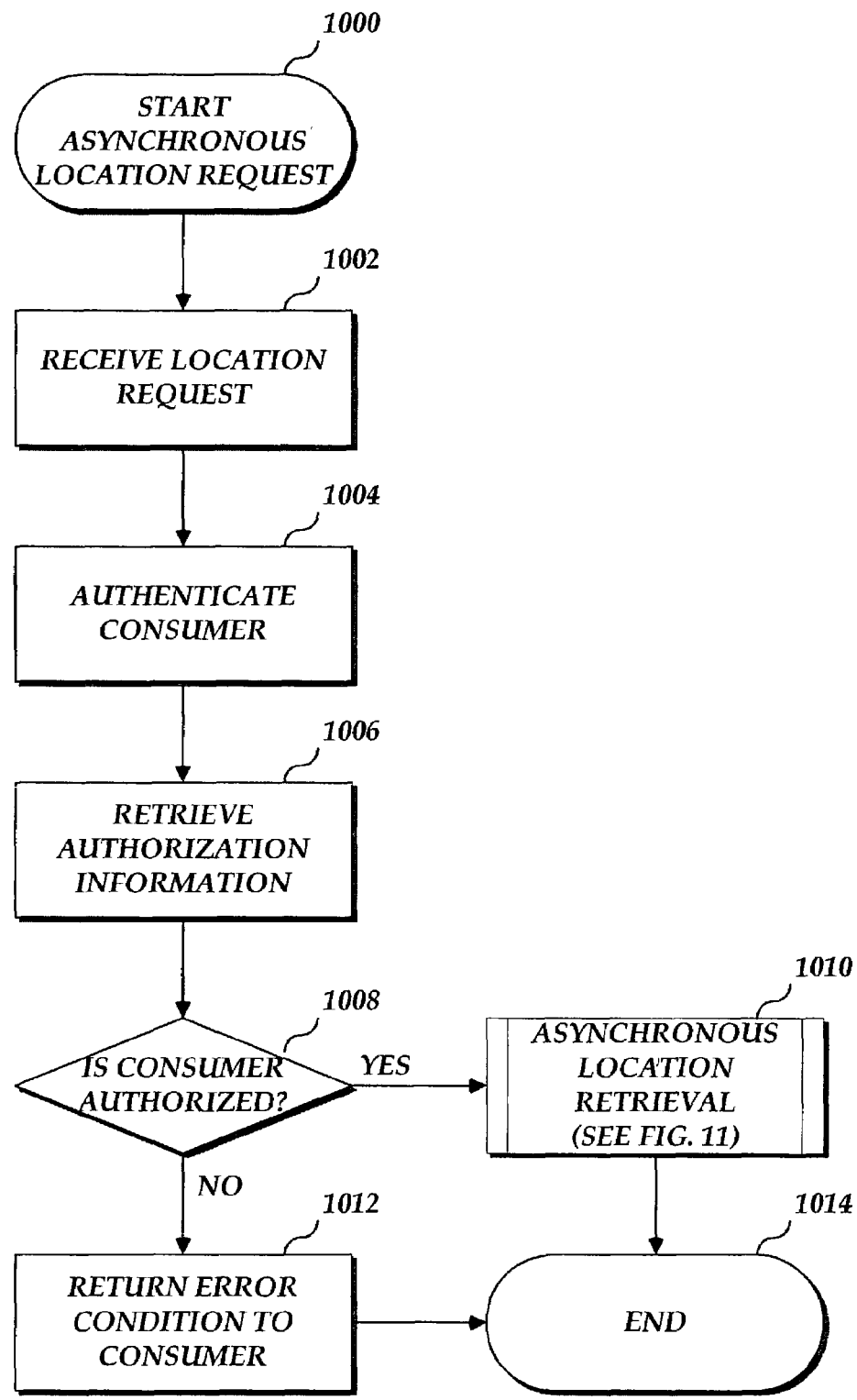
FIG. 10 is a flow diagram illustrative of an exemplary routine implemented by the location services server to receive and process an asynchronous location request from a location consumer.

FIG. 10 is a flow diagram of an exemplary routine 1000 implemented by the location services server 202 to receive and process an asynchronous location request from a location consumer. At block 1002, the location services server 202 receives the location request from a location consumer. At block 1004, the location services server 202 authenticates the location consumer that submitted the location request, as previously described in relation to FIG. 7A (block 704). After authenticating the location consumer, at block 1006, the location services server 202 retrieves authorization information included in the owner profile information corresponding to the targeted location owner from the owner profile database 308, also previously described in relation to FIG. 7A (block 706).

After retrieving the authorization information for the targeted location owner, at block 1008, a test is made to determine whether the location consumer is authorized to make the location request, as described above in regard to FIG. 7A (block 708). If the location consumer is not authorized, or does not have the necessary permissions to make the location request, at block 1012, an error condition is returned to the location consumer. Alternatively, if the location consumer is authorized to request the location owner's location information, at block 1010, an asynchronous location retrieval subroutine is initiated. In contrast to the synchronous location request described in FIG. 7A, an asynchronous location request initiates a separate asynchronous location retrieval subroutine and then terminates the current routine, thus freeing the location consumer from waiting for a response to the location request. While this method describes certain steps prior to termination, they are to be construed as illustrative and not limiting. Those skilled in the art will recognize that more or fewer steps may be taken prior to terminating the asynchronous location request without departing from the scope of the present invention. At block 1014 the routine terminates.

Figure 11:
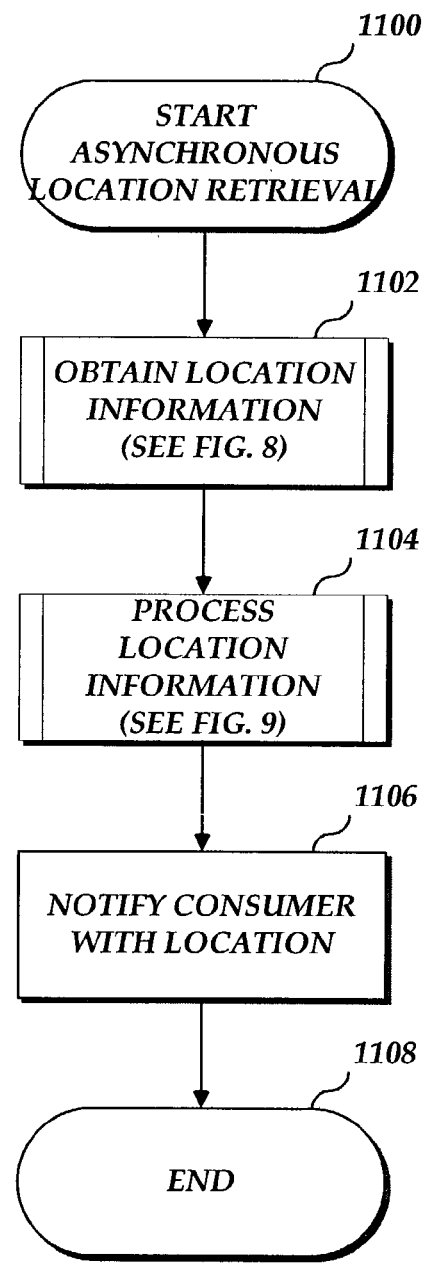
FIG. 11 is a flow diagram illustrative of an exemplary asynchronous location retrieval subroutine suitable for use in FIG. 10.

FIG. 11 is a flow diagram of an exemplary subroutine 1100 for processing an asynchronous location request from a location consumer. At block 1102, the asynchronous location retrieval method obtains location information. Since an illustrative subroutine for obtaining location information is described above in relation to FIG. 8, such a subroutine is not described again here. After having retrieved the location information from the location providers, at block 1104, the retrieved location information is processed to generate a single location. Since an illustrative subroutine for processing the location information retrieved from location providers is described above in relation to FIG. 9, such a subroutine is not described again here. After generating the location information, at block 1106, the generated location corresponding to the location owner is transmitted to the location consumer. As previously described, the location services server 202 may transmit the location information directly to the location consumer. Alternatively, the location services server 202 may utilize an external notification service to return the generated location information to the location consumer. At block 1108 the subroutine terminates.

Figure 12:
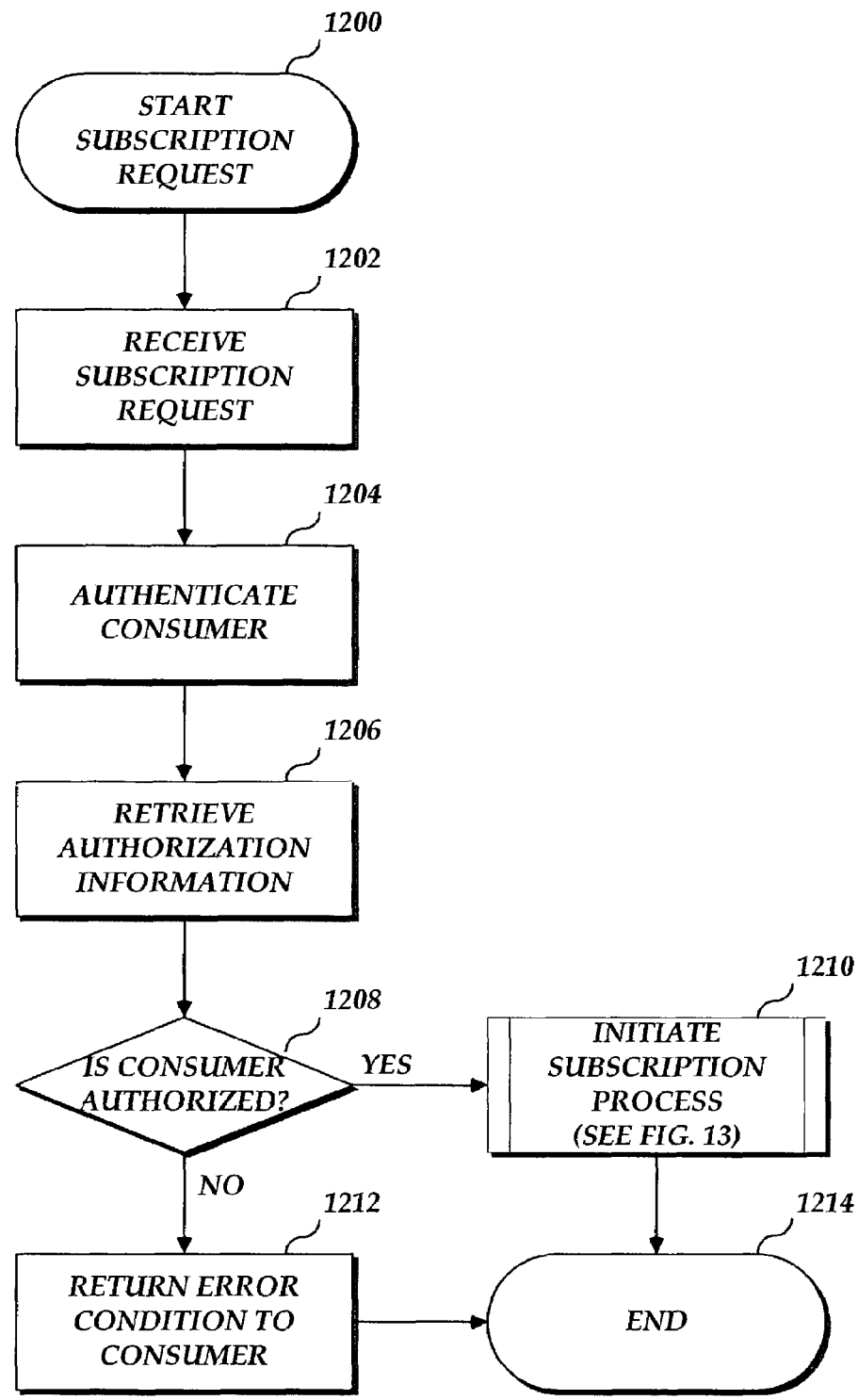
FIG. 12 is a flow diagram illustrative of an exemplary routine for receiving and initiating a location subscription request from a location consumer.

FIG. 12 is a flow diagram of an exemplary routine 1200 for receiving and processing a location subscription request received from a location consumer. While a synchronous and an asynchronous location request require that the location services server provide a single location in response to the request, a subscription request is typically a request to continually receive updates from the location services server concerning the location of the targeted location owner. Beginning at block 1202, the information services server 202 receives a subscription request from a location consumer. At block 1204, the location consumer is authenticated, as previously described in relation to FIG. 7A. After having authenticated the location consumer, at block 1206, the method commences an authorization process by retrieving authorization information for the location owner from the owner profile database 308, also previously described in relation to FIG. 7A.

At decision block 1208, a test is made to determine whether the location consumer is authorized to subscribe to the targeted location owner. If the location consumer is not authorized to subscribe to the location owner according to the authorization information retrieved, at block 212, an error condition is returned to the location consumer. Alternatively, if the location consumer is authorized to subscribe to the location owner's location information, at block 1210, a subscription process is initiated. At block 1214 the routine terminates. Those skilled in the art will recognize that more or fewer steps may be taken prior to terminating the subscription request without departing from the scope of the invention.

Figure 13:
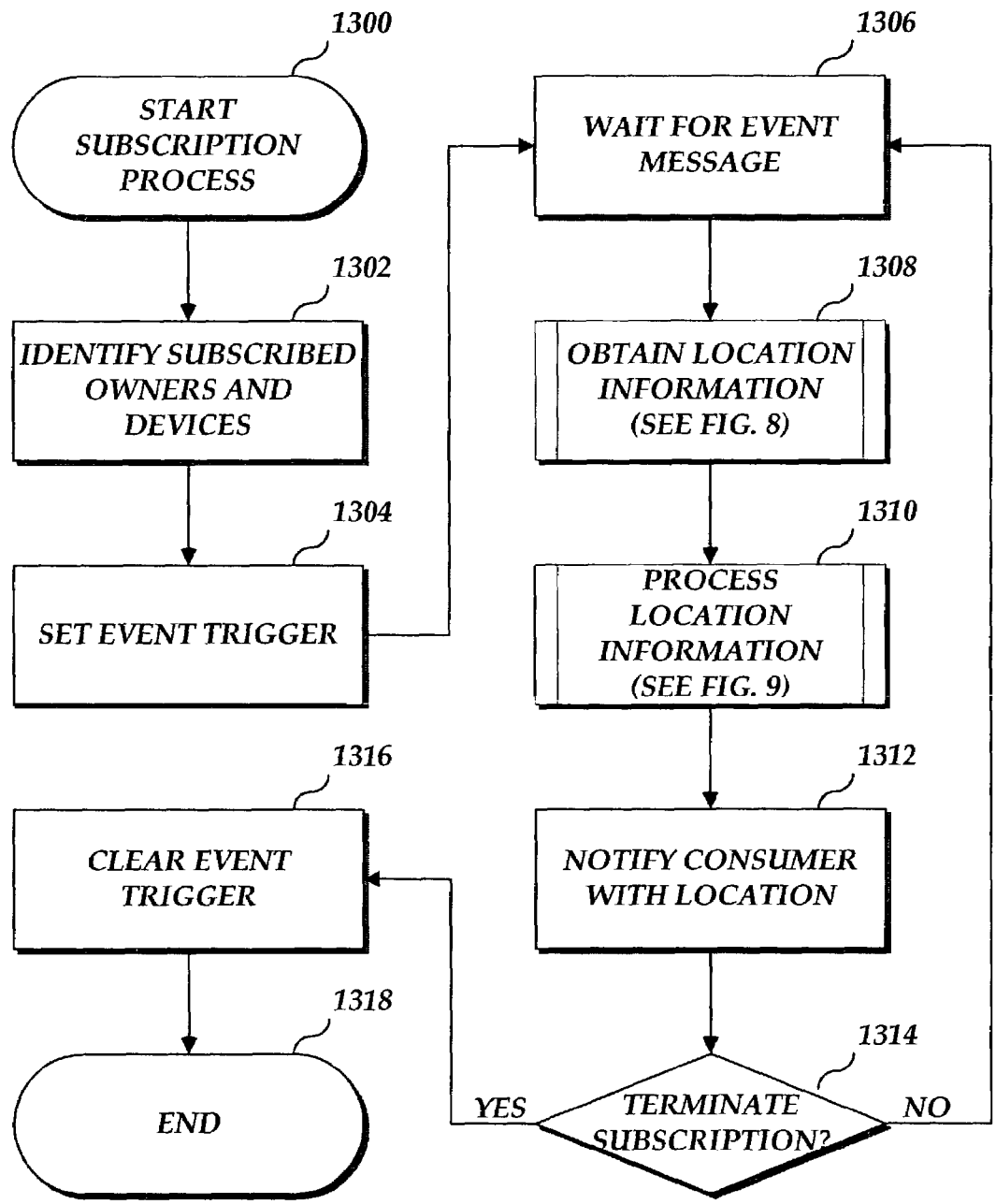
FIG. 13 is a flow diagram illustrative of an exemplary intake subscription process subroutine suitable for use in FIG. 12.

FIG. 13 is a flow diagram of an exemplary subroutine 1300 of a subscription process suitable for use in of FIG. 12 (block 1210). Beginning at block 1302, the subscription process identifies the subscribed location owner and associated location providers. A subscription request can designate more than one subscribed owner. Or, a subscription request must designate one location owner for each subscription request. Alternatively, other criteria may be used after identifying the subscribed owner and associated location providers, at block 1304, the subscription process creates event triggers.

Event triggers are processes that monitor certain information according to a subscribed event, and generate, or "trigger," an event message when the subscribed event occurs. For example, a subscribed event may be a timer event such that an event trigger generates an event message after a certain amount of time, identified in the timer event, expires. As another example, a subscribed event may be a geographic area event such that an event trigger generates an event message when the location owner's location information changes with respect to a particular geographic location. The location services server 202 notifies the location providers of the subscribed event, so that the location providers will able to provide the necessary notification when the subscribed event occurs.

At block 1306, the subscription process waits for an event message, indicating that the subscribed event has occurred. At block 1308, the location services server 202 obtains location information from the location providers corresponding to the location owner. Location information may be obtained in the manner previously described with regard to FIG. 8. Next, at block 1310, the location services server 202 processes the location information retrieved from the location providers to generate a single location. Preferably, the retrieved location information is processed in the manner previously described in relation to FIG. 9. At block 1312, the location consumer is notified of the generated location information according to the subscription request, as described previously in relation to FIG. 11 (block 1106).

After notifying the location consumer of the generated location according to the subscription request, at decision block 1314, a test is made to determine whether to terminate the subscription process. This determination may be based on termination information provided the in the subscription request. Alternatively, the determination may be based on internal predetermined values. The termination information may include, but is not limited to, expiration dates, and frequency of subscribed event processing. Alternatively, the location consumer may issue a request to terminate the subscription request. Or, the location owner may cause the subscription request to be terminated. Those skilled in the art will appreciate that there are other mechanisms may be used to terminate the subscription request which, although not described, fall within the scope of the invention. At block 1306, if the subscription process is not to be terminated, the subscription process waits for another event message. Alternatively, if the subscription process is to be terminated, at block 1316, the subscription process clears any remaining event triggers. Termination may include notifying the location providers of the termination of the subscription request. At block 1318 the subscription process terminates.

While various embodiments of the invention have been illustrated and described, it will be appreciated that various changes can be made therein without departing from the spirit and scope of the invention as defined by the appended claims.

The invention claimed is:

1. A computer system for providing information about the location of location owners to a location consumer in response to the receipt of a location request from said location consumer comprising:
   (a) data storage for storing a location owner profile information suitable for controlling access to information about the location of the associated location owner ("location information"), the location owner profile information including data describing a time period during which the location consumer is authorized to access location information; and
   (b) a data processing system for:
      (i) receiving requests from location consumers for information about the location of location owners;
      (ii) in response to the receipt of a request from a location consumer for location information, obtaining the location owner profile information from said data storage associated with said location owner;
      (iii) determining if a time associated with the request corresponds with the time period during which the location consumer is authorized to access location information;
      (iv) obtaining from at least one location provider information about the location of said location owner;
      (v) processing the information provided by the location provider about the location of said location owner in accordance with said location owner profile information obtained from said data storage; and
      (vi) if it is determined that the time associated with the request corresponds with the time period during which the location consumer is authorized to access information about the location of the location owner, transmitting the result of said processing of the information provided by the location provider to said location consumer requesting information about the location of said location owner.

2. The computer system of claim 1, wherein determining if a time associated with the request corresponds with the time period during which the location owner is authorized to access location information comprises:
   obtaining the time when the request was received from a location owner for location information;
   obtaining authorization data from the owner profile, the authorization data including the time period during which the invention consumer is authorized to access the location information;
   determining if the time when the request was received from a location owner for location information falls within the time period during which the location consumer is authorized to access the location information; and
   if the time when the request was received from a location owner falls within the time period during which the location consumer is authorized to access the location information transmitting the result of said processing of the information provided by the location provider to said location consumer requesting information about the location of said location owner.

3. The computer system of claim 2, wherein the authorization data describes a plurality of time periods during which the location consumer is authorized to access location information.

4. The computer system of claim 3, wherein the plurality of time periods is associated with at least one calendar date.

5. The computer system of claim 1, wherein the location owner profile information includes data describing a group of location consumers authorized to access location information during said time period.

6. The computer system of claim 5, wherein determining if a time associated with the request corresponds with the time period during which the location owner is authorized to access location information comprises:
   obtaining the time when the request was received from a location owner for location information;
   obtaining authorization data from the owner profile, the authorization data including the time period during which the invention consumer is authorized to access the location in formation;
   determining if the time when the request was received from a location owner for location information falls within the time period during which the location consumer is authorized to access the location information; and
   if the time when the request was received from a location owner falls within the time period during which the location consumer is authorized to access the location information, transmitting the result of said processing of the information provided by the location provider to said location consumer requesting information about the location of said location owner.

7. The computer system of claim 6, wherein the authorization data describes a plurality of time periods during which the group of location consumer is authorized to access location information.

8. The computer system of claim 7, wherein the plurality of time periods is associated with at least one calendar date.

9. The computer system of claim 1, wherein the computer system further comprises an administrative module for allowing the location owner to modify the data describing a time period during which the location consumer is authorized to access location information.

10. The computer system of claim 1, wherein the time period is established by the location owner.

11. A method for providing information about the location of a location owner to a location consumer in response to the receipt of a location request produced by the location consumer, comprising:
   (a) in response to receiving a location request from a location consumer requesting information about the location of a location owner, obtaining an owner profile associated with the location owner, the owner profile including data describing a time period and a group of location consumers authorized to access information about the location of the associated location owner ("location during said time period information");

(b) using the time period during which the location consumer is authorized to access location information to determine whether a location consumer of the group of location consumers is authorized to receive information about the location of the location owner comprising the step of:

obtaining the time when the request was received from the location owner for the location information; and determining if the time when the request was received from the location owner for location information falls within the time period during which the location consumer is authorized to access the location information, such that if the time falls within the time period the location consumer is authorized; and (c) if the location consumer is authorized to receive information about the location of the location owner:

(i) obtaining information about the location of the location owner from a location provider;

(ii) processing the obtained information about the location of the location owner in accordance with the owner profile; and (iii) transmitting the results of the processing of the obtained information to the location consumer.

12. The method of claim 11, further comprising transmitting an error message to the location consumer if the location consumer is not authorized to receive information about the location of the location owner.

13. The method of claim 11, wherein the owner profile describes a plurality of time periods during which the location consumer is authorized to access location information.

14. The method of claim 13, wherein the plurality of time periods is associated with at least one calendar date.

15. A computer-readable medium having computer readable instructions which, when executed on a computing device, carry out the method recited in claim 11.

16. A computer system having a memory, a processor, and an operating environment configured to perform the method recited in claim 11.

* * * * *